(12) United States Patent
Lee et al.

(10) Patent No.: US 12,437,552 B2
(45) Date of Patent: Oct. 7, 2025

(54) METHOD AND APPARATUS FOR DETECTING AN OBJECT BASED ON IDENTIFICATION INFORMATION OF THE OBJECT IN CONTINUOUS IMAGES

(71) Applicant: KOOKMIN UNIVERSITY INDUSTRY ACADEMY COOPERATION FOUNDATION, Seoul (KR)

(72) Inventors: Won Woo Lee, Incheon (KR); Jin Woo Yoo, Gyeonggi-do (KR); Yoon Suk Choi, Gyeonggi-do (KR); Jin Gwan Kim, Jeollanam-do (KR); Dong Sun Lim, Gyeonggi-do (KR); Hoo Kyung Lee, Seoul (KR)

(73) Assignee: KOOKMIN UNIVERSITY INDUSTRY ACADEMY COOPERATION FOUNDATION, Seoul (KR)

(*) Notice: Subject to any disclaimer, the term of this patent is extended or adjusted under 35 U.S.C. 154(b) by 460 days.

(21) Appl. No.: 17/694,551

(22) Filed: Mar. 14, 2022

(65) Prior Publication Data
US 2023/0025770 A1    Jan. 26, 2023

(30) Foreign Application Priority Data

Jul. 19, 2021 (KR) .......................... 10-2021-0094338
Sep. 9, 2021 (KR) .......................... 10-2021-0120463
(Continued)

(51) Int. Cl.
*G06V 20/58* (2022.01)
*G06V 10/25* (2022.01)
*G06V 10/764* (2022.01)

(52) U.S. Cl.
CPC .............. *G06V 20/58* (2022.01); *G06V 10/25* (2022.01); *G06V 10/764* (2022.01); *G06V 2201/07* (2022.01)

(58) Field of Classification Search
CPC ...... G06V 20/58; G06V 10/25; G06V 10/764; G06V 2201/07
See application file for complete search history.

(56) References Cited

U.S. PATENT DOCUMENTS

2018/0286199 A1* 10/2018 Chen .................. G06V 10/46
2019/0066313 A1*  2/2019 Kim .................. G06T 7/246
(Continued)

FOREIGN PATENT DOCUMENTS

JP        2011053933 A     3/2011
KR    1020190126366 A    11/2019
(Continued)

OTHER PUBLICATIONS

Lee, "Improved Deep Learning Network based on Key information for Sequential Images," Transactions of KSAE, pISSN 1225-6382 / eISSN 2234-0149, DOI http://dx.doi.org/10.7467/KSAE.00.0.000, 2021, Jun. 23, 2021, 35 pages.
Lee, "An Improved Deep Learning Network Based on Key Information Using Sequential Properties of Images," Transactions of KSAE, vol. 29, No. 10, pp. 951-958 (Oct. 2021), pISSN 1225-6382 / eISSN 2234-0149, DOI http://dx.doi.org/10.7467/KSAE.2021.29. 10.951, Oct. 1, 2021, 8 pages.
(Continued)

*Primary Examiner* — Molly Wilburn
(74) *Attorney, Agent, or Firm* — Berkeley Law & Technology Group, LLP

(57) ABSTRACT

An object detection method and apparatus are disclosed. The object detection method may include acquiring identification information of an object detected from each of N (N being a preset integer of 3 or more) images continuous in order of capture from the output of a classification layer of an object detection deep learning network and correcting, based on the identification information of the object detected from each of at least two images that have been captured (Continued)

early in order of time, among the N images, the identification information of the object detected from an image that has been captured later in order of time than the at least two images that have been captured early in order of time, among the N images.

20 Claims, 17 Drawing Sheets

(30) Foreign Application Priority Data

Oct. 20, 2021 (KR) ........................ 10-2021-0139884
Dec. 1, 2021 (KR) ........................ 10-2021-0170096

(56) References Cited

U.S. PATENT DOCUMENTS

| | | | |
|---|---|---|---|
| 2019/0073568 A1* | 3/2019 | He | G06F 18/40 |
| 2019/0286932 A1* | 9/2019 | Du | G06V 20/00 |
| 2021/0365724 A1* | 11/2021 | Lee | G06T 7/73 |

FOREIGN PATENT DOCUMENTS

| | | | | |
|---|---|---|---|---|
| KR | 102000075072 A | 6/2020 | | |
| KR | 10202110031284 A | 3/2021 | | |
| WO | WO-2020056509 A1 * | 3/2020 | ......... | G06K 9/00261 |

OTHER PUBLICATIONS

Lee, "Bunch-of-Keys Module for Optimizing a Single Image Detector Based on the Property of Sequential Images," Received Sep. 27, 2021, accepted Oct. 16, 2021, date of publication Oct. 18, 2021, date of current version Oct. 29, 2021, Digital Object Identifier 10.1109/ACCESS.2021.3121309, Oct. 18, 2021, 13 pages.

Krizhevsky, "ImageNet Classification with Deep Convolutional Neural Networks," http://code.google.com/p/cuda-convnet/, 2012, 9 pages.

Liu, "SSD: Single Shot MultiBox Detector," Springer International Publishing AG 2016, B. Leibe et al. (Eds.): ECCV 2016, Part I, LNCS 9905, pp. 21-37, 2016, DOI: 10.1007/978-3-319-46448-0_2, 17 pages.

Redmon, "You Only Look Once: Unified, Real-Time Object Detection," https://ieeexplore.ieee.org/document/7780460, 2016 IEEE Conference on Computer Vision and Pattern Recognition (CVPR), 10 pages.

Request for the Submission of an Opinion, App. No, KR10-2021-0120463, Filed Sep. 9, 2021, 13 pages.

Han, et al., "Seq-NMS for Video Object Detection," arXiv:1602.08465v3 [cs. CV] Aug. 22, 2016, 9 pages.

Request for the Submission of an Opinion, App. No, KR100210170096, Mailed Dec. 5, 2024, 17 pages.

Notice of Allowance, App. No, KR10-2021-01170096, Filed Sep. 9, 2021, 13 pages.

* cited by examiner (a)

Generated Rectified Key
(b)

Generated Tracking Key
(c)

METHOD AND APPARATUS FOR DETECTING AN OBJECT BASED ON IDENTIFICATION INFORMATION OF THE OBJECT IN CONTINUOUS IMAGES

CROSS-REFERENCE TO RELATED APPLICATIONS

The present application claims benefit of priority to Korean Patent Application No. 10-2021-0094338, entitled IMPROVED DEEP LEARNING NETWORK BASED ON KEY INFORMATION FOR SEQUENTIAL IMAGES, filed on Jul. 19, 2021, in the Korean Intellectual Property Office, the entire disclosure of which is incorporated herein by reference.

The present application claims benefit of priority to Korean Patent Application No. 10-2021-0120463, entitled METHOD AND APPARATUS FOR DETECTING AN OBJECT, filed on Sep. 9, 2021, in the Korean Intellectual Property Office, the entire disclosure of which is incorporated herein by reference.

The present application claims benefit of priority to Korean Patent Application No. 10-2021-0139884, entitled METHOD AND APPARATUS FOR DETECTING AN OBJECT, filed on Oct. 20, 2021, in the Korean Intellectual Property Office, the entire disclosure of which is incorporated herein by reference.

The present application claims benefit of priority to Korean Patent Application No. 10-2021-0170096, entitled METHOD AND APPARATUS FOR DETECTING AN OBJECT BASED ON TRACKING KEY OF CONTINUOUS IMAGES, filed on Dec. 1, 2021, in the Korean Intellectual Property Office, the entire disclosure of which is incorporated herein by reference.

STATEMENT REGARDING GOVERNMENT SUPPORT

The present disclosure was supported by the National Research Foundation of Korea (NRF) grant funded by the Korea government (MSIT) (No. NRF-2021R1A5A1032937).

BACKGROUND OF THE INVENTION

Field of the Invention

The present disclosure relates to an object detection method and apparatus capable of improving object detection precision of a deep learning network that detects an object in an image.

Description of the Related Art

Detecting objects in images and classifying the same has evolved from a method using traditional techniques to a method using deep learning. By introducing convolution, classifying images (while preserving the structural meaning of the images), detecting the object position within the image and classifying the class have become possible.

Existing deep learning requires a lot of computation expenses and thus has difficulty in use. After AlexNet network disclosed in Prior Art Document 1 is proposed, however, deep learning has been rapidly developed, and various research on network structure, image pre-processing, and image post-processing has been conducted. In addition, research on utilization of deep learning in the fields of medical treatment, transportation, aviation, etc. has also been actively conducted.

Particularly, in the field of autonomous driving, various research on utilization of a camera has been conducted after the You Only Look Once (YOLO) network disclosed in Prior Art Document 2 and a real-time detector, such as Single Shot Multibox-Detector (SSD) disclosed in Prior Art Document 3, were proposed.

However, most deep learning networks for object recognition are configured to detect an object from a single image, whereby there is a problem in that object detection results are different from each other even though the same object exists in continuous images.

The background art described above may be technical information retained by the present inventors in order to derive the present disclosure or acquired by the present inventors along the process of deriving the present disclosure, and thus is not necessarily known art disclosed to the general public before the filing of the present application.

PRIOR ART DOCUMENTS

Non-Patent Documents

Prior Art Document 1: K. Alex, I. Sutskever and G. E. Hinton, *IMAGENET CLASSIFICATION WITH DEEP CONVOLUTIONAL NEURAL NETWORKS*, Advances in Neural Information Processing Systems, Vol. 25, pp. 1097-1105, 2012

Prior Art Document 2: Redmon, S. Divvala, R. Girshick and A. Farhadi, *YOU ONLY LOOK ONCE: UNIFIED, REAL-TIME OBJECT DETECTION*, Proceedings of the IEEE Computer Society Conference on Computer Vision and Pattern Recognition, pp. 779-788, 2016

Prior Art Document 3: W. Liu, D. Anguelov, D. Erhan, C. Szegedy, S. Reed, C. Fu and A. C. Berg, *SSD: SINGLE SHOT MULTIBOX DETECTOR*, European Conference on Computer Vision, pp. 21-37, 2016

SUMMARY OF THE INVENTION

It is an object of the present disclosure to perform post processing with respect to a deep learning network pre-trained so as to detect an object from an image in real time, thereby improving precision in object detection based on continuous images.

Objects of the present disclosure are not limited to the above-mentioned object, and other objects and advantages of the present disclosure, which are not mentioned, will be understood through the following description, and will become apparent from embodiments of the present disclosure. It is also to be understood that the objects and advantages of the present disclosure may be realized by means and combinations thereof set forth in claims.

In accordance with the present disclosure, the above and other objects can be accomplished by the provision of an object detection method including acquiring identification information of an object detected from each of N (N being a preset integer of 3 or more) images continuous in order of capture from the output of a classification layer of an object detection deep learning network and correcting, based on the identification information of the object detected from each of at least two images that have been captured early in order of time, among the N images, the identification information of the object detected from an image that has been captured later in order of time than the at least two images that have been captured early in order of time, among the N images.

In addition, another method and system for implementing the present disclosure, and a computer-readable recording medium storing a computer program for executing the method may be further provided.

Other aspects and features in addition to those described above will become clear from the accompanying drawings, claims, and the detailed description of the present disclosure.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

Figure 1:
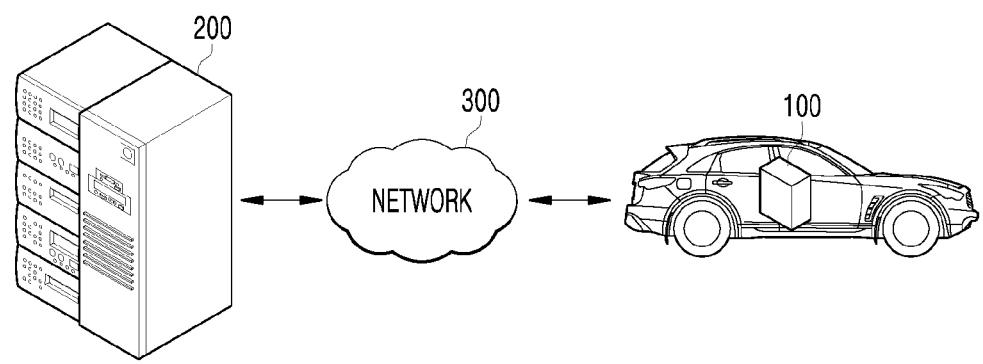
FIG. 1 is a view schematically showing an object detection system according to an embodiment of the present disclosure.

The advantages and features of the present disclosure and methods of achieving the same will be apparent from the embodiments described below in detail in conjunction with the accompanying drawings.

However, the description of particular exemplary embodiments is not intended to limit the present disclosure to the particular exemplary embodiments disclosed herein, but on the contrary, it should be understood that the present disclosure is to cover all modifications, equivalents, and alternatives falling within the spirit and scope of the present disclosure. The embodiments disclosed below are provided so that this disclosure will be thorough and complete and will fully convey the scope of the present disclosure to those skilled in the art. In the following description of embodiments of the present disclosure, a detailed description of related known technology will be omitted when the same may obscure the subject matter of the embodiments of the present disclosure.

The terminology used herein is used for the purpose of describing particular example embodiments only and is not intended to be limiting. It must be noted that, as used herein and in the appended claims, the singular forms include the plural forms unless the context clearly dictates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. Furthermore, terms such as "first," "second," and other numerical terms, are used only to distinguish one element from another element. These terms are generally only used to distinguish one element from another.

Hereinafter, embodiments of the present disclosure will be described in detail with reference to the accompanying drawings. Like reference numerals designate like elements throughout the specification, and overlapping descriptions of the elements will not be provided.

Figure 2:
FIG. 2 is an illustrative view showing results of conventional object detection with respect to continuous images.

FIG. 1 is a view schematically showing an object detection system according to an embodiment of the present disclosure, and FIG. 2 is an illustrative view showing results of conventional object detection with respect to continuous images.

Referring to FIG. 1, the object detection system 1 according to this embodiment may include an object detection apparatus 100, a server 200, and a network 300.

In an embodiment, the object detection apparatus 100 may compare pixel information of a bounding box, such as position, size, and color, as the result of object detection (object recognition) with respect to three images continuous in order of capturing time by an object recognition network to generate a key necessary to correct object detection results.

In an embodiment, in order to correct the results of object detection by the object recognition network, the object detection apparatus 100 may generate a rectifying key or a tracking key from the results of object detection by the object recognition network. The rectifying key or the tracking key may be a vector having an ID of a bounding box as an element. Subsequently, the object detection apparatus 100 may correct identification information of an object detected from one of the three images based on the rectifying key or the tracking key. correct the identification information may entail detecting an object that has not been detected by the object detection network, excluding an object that has been false detected by the object detection network, or merging objects that have been detected by the object detection network in duplicate. Merging the objects that have been detected in duplicate may entail correct the size of a bounding box of the detected objects or the shape of the bounding box including coordinates.

For example, as shown in FIG. 2, when the object detection network does not detect, from a second image, an object detected from a first image and a third image (indicated by an arrow), the object detection apparatus 100 may rectify identification information of the object that has not been detected from the second image based on the rectifying key to improve precision in object detection.

In another embodiment, the object detection apparatus 100 may compensate for a bounding box of the object that has been lost from the third image for no reason (i.e. the object that has not been detected by the object detection network) based on the tracking key (i.e. may correct by tracking identification information of the object).

In the following description, compensating for the bounding box, e.g. adding, merging, and deleting the bounding box, may be understood as correcting identification information of the object. Also In the following description, when the object is corrected by tracking the identification information, it can be described as tracking.

In an embodiment, the object detection apparatus 100 may determine a final bounding box (object) to be compensated for with respect to a target image included in the rectifying key or the tracking key generated based on similarity between bounding boxes.

A conventional object detection network is trained to sense an object from a single image, rather than continuous images. In contrast, the object detection apparatus 100 according to the embodiment of the present disclosure, which is an apparatus specialized to improve precision in object detection with respect to continuous images. And the object detection apparatus 100 may be implemented so as to use a post-processing method capable of improving performance without changing the structure of a pre-trained object detection network thereof while using a conventional object detection network that processes a single image without change.

In other words, conventional deep learning networks are implemented in a way that object detection is performed on individual images by using networks trained in individual situations, or are trained to target consecutive situations in a continuous situation, even when the object is covered. It is implemented in such a way that the object is continuously tracked. Therefore, the conventional deep learning networks have a different point of view from the object detection system 1 because there is an intention to continuously find objects that have been detected once. Accordingly, the conventional deep learning networks may have low detection accuracy when they are obscured by other objects or slightly distorted in the image.

In an embodiment, the object detection apparatus may be implemented by an internal component 100 of a car, an airplane, or an image monitoring apparatus. In another embodiment, a portion or the entirety of the object detection apparatus may be implemented as the server 200.

When the object detection apparatus is implemented as the server 200, the object detection apparatus may transmit an image taken from the car, the airplane, or the image monitoring apparatus or an object detection result to the server 200, and the server 200 may perform object detection with respect to each image based on continuous images or corrects the detection result. In the following embodiments, a description will be given on the premise that the object detection apparatus may be implemented by the internal component 100 of the car, the airplane, or the image monitoring apparatus.

In an embodiment, the object detection apparatus 100 may be implemented as a construction including an identification layer of an object detection network and an identification information correcting module after the identification layer. In another embodiment, the object detection apparatus 100 may be implemented as a post-processing module of a pre-trained object detection network.

When the object detection apparatus 100 is implemented as a construction including an identification layer of an object detection network and an identification information correcting module after the identification layer, the object detection apparatus 100 may learn training data for object detection based on precision (the degree of convergence) of the identification layer or may learn training data for object detection based on precision of the identification information correcting module.

Although the following embodiments will be described as embodiments in which an object detection apparatus 100 is implemented as a post-processing module of a pre-trained object detection network, it is not excluded that the object detection apparatus 100 is implemented as a construction including an identification layer of an object detection network and an identification information correcting module after the identification layer.

Figure 3:
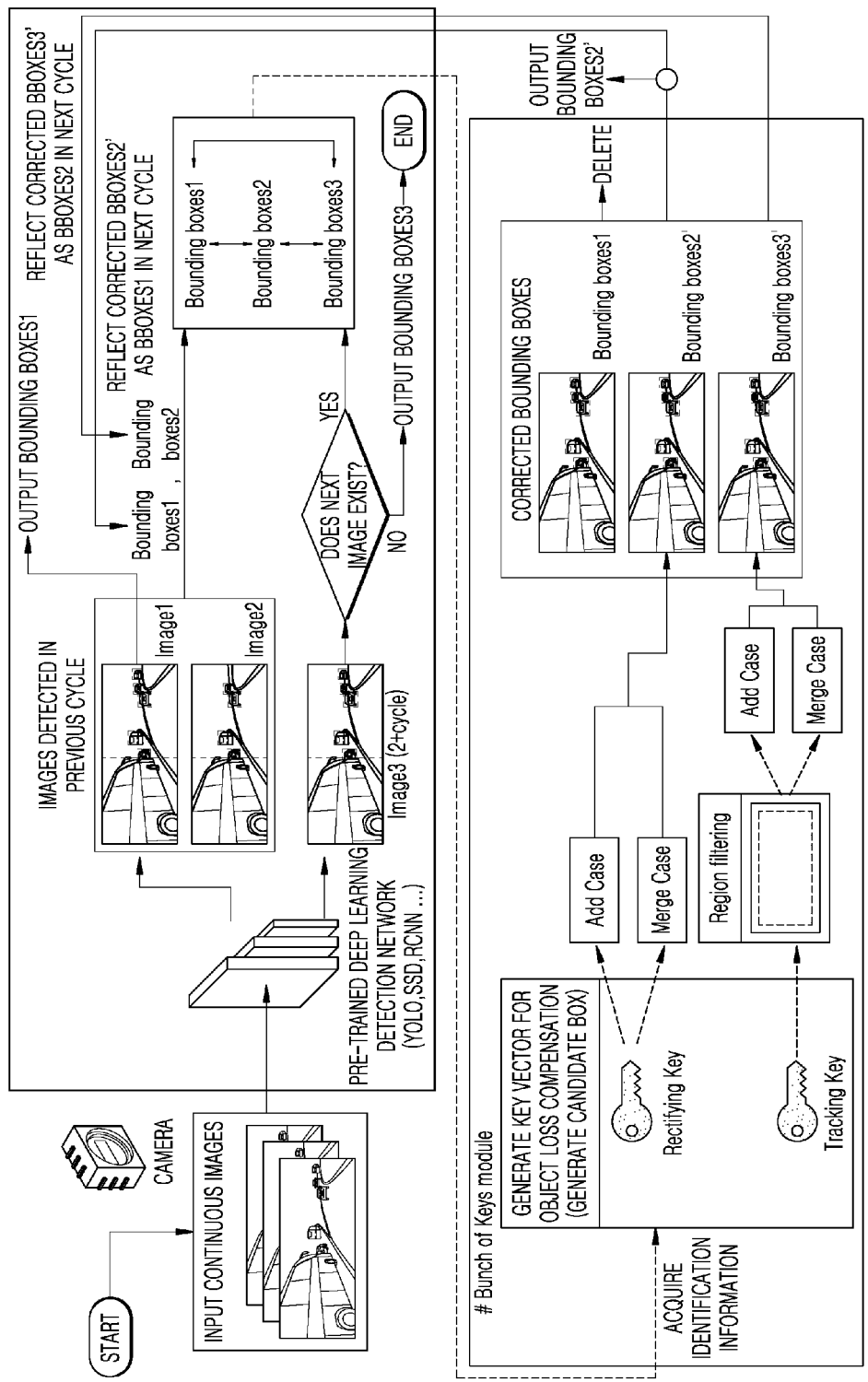
FIG. 3 is an illustrative view illustrating a process of the object detection system according to the embodiment of the present disclosure.

FIG. 3 is an illustrative view illustrating a process of the object detection system according to the embodiment of the present disclosure.

The object detection apparatus 100 according to the embodiment of the present disclosure may be implemented by the process shown in FIG. 3. In an embodiment, an algorithm for implementing a process of rectifying identification information of an object detected based on a rectifying key shown in FIG. 3 may be schematically represented, as shown in Table 1 below.

TABLE 1

Algorithm (Detections of Image1 and Image2 are performed before entering the while loop)

while(When there is an input value)
① Enter the next image
② Image detection using Detector (get Bboxes3, Labels3, Scores3)
③ Calculation of Bboxes1 ↔ Bboxes2 and Bboxes1 ↔ Bboxes3 comparison values using a comparison algorithm (GIoU)
④ Extract the maximum value of the calculated value, filter using preset GIoU LIMIT, and generate Key1 and Key2
⑤ calculate Key2 − Key1 to create a key vector that needs to be updated
⑥ Calculation of the similarity between for add box calculated based on the key vector and existing Bboxes2 (using CIoU)
⑦ Boxes less than the preset CIoU Criteria value are added.
⑧ Other boxes are merged with the boxes inside Bboxes2 with the highest similarity.
end That is, the object detection apparatus 100 may receive continuous images taken by a camera in a sliding window manner, and may perform object detection with respect to each image using a pre-trained object detection network.

The overall process of correcting identification information of a detected object based on the rectifying key or the tracking key will be schematically described with reference to FIG. 3.

When the object detection apparatus 100 is initially operated based on three continuous images, the captured images are input to the object detection network in order of capturing time. For the first input image, the result of object detection by the pre-trained object detection network may be output as a result, since there is no object detection information of a previously captured image, the result of object detection with respect to the first input image and the result of object detection with respect to the second input image may be stored, the result of object detection with respect to the third input image may be checked, and the result of object detection with respect to the second image may be rectified based on the rectifying key.

Subsequently, the object detection apparatus 100 may rectify the result of object detection with respect to the third image based on the rectifying key using the result of object detection with respect to the second and fourth images by the object detection network. The same operation may be performed with respect to subsequent images.

In another embodiment, the object detection apparatus 100 may correct the result of object detection with respect to the third image based on the tracking key after checking the result of object detection with respect to the third image. Subsequently, the object detection apparatus 100 may generate a tracking key using the result of object detection with respect to the second and third images by the object detection network, and may correct the result of object detection with respect to the fourth image based on the tracking key. The same operation may be performed with respect to subsequent images.

That is, in an embodiment, the object detection apparatus 100 may compare bounding boxes that the object detection network has detected from the respective images with each other, and may store information about the same object in the respective images in a key vector. A key vector generation method may be changed depending on the rectifying key or the tracking key.

For example, the object detection apparatus 100 may generate and use a rectifying key necessary to rectify the second image and a tracking key necessary to tracking the third image in a sliding window. The generated keys may contain information about the matched boxes, and a candidate bounding box to be added to a target image may be generated using the same. Subsequently, a candidate bounding box may be drawn at the position of an object that has not been detected in each image to improve network performance.

In other words, referring to FIG. 3, the results of object detection with the three continuous images by the conventional object detection network may be sequentially stored in a first bounding box set, a second bounding box set, and a third bounding box set, respectively. At this time, a key configured to store information about whether the objects are the same based on continuity of position information may be generated, and a candidate bounding box to be added to the target image may be generated based on the generated key. When the target image has no bounding box corresponding to the candidate bounding box, addition of a bounding box may be performed. Otherwise, merging of corresponding bounding boxes may be performed.

First, the following embodiment describes a method of rectifying the result of object detection with respect to a second image (a rectified image), among three continuous images, based on a rectifying key.

In an embodiment, a rectifying key vector may be generated as comparison information between images based on bounding boxes, which are results of object detection with respect to three images continuous in order of time, a candidate bounding box may be generated using the rectifying key vector, and the result of object detection with respect to the second image (the rectified image) may be rectified based on the candidate bounding box. At this time, when the bounding box indicating the result of object detection already exists at the position of the candidate bounding box of the rectified image, the existing bounding box of the second image and the candidate bounding box may be merged. When a bounding box corresponding to the candidate bounding box does not exist at the second image, the candidate bounding box may be added to the result of object detection with respect to the second image.

The object detection apparatus 100 may check whether identification information of the object detected from the first image has been input from the pre-trained object detection network. At this time, when the identification information of the object detected from the first image is input from the pre-trained object detection network, the object detection apparatus 100 may set N (e.g. three) images sequentially input to an image set. Otherwise, identification information of an object detected from the next image may be acquired, and N (e.g. three) images including the next image may be set to an image set in a sliding window manner. This is to check whether there is an image detected in a first cycle or a previous cycle in order for the object detection system 1 to process images in the sliding window manner, which may be omitted depending on embodiments.

At this time, the first image may be a reference image for object detection loss compensation, and the third image may be a comparative image that becomes a comparison target for determining whether to perform rectification. The second image, which is an image acquired between the first image and the third image, may be a rectified image that becomes a target to be rectified. That is, among the first image, the second image, and the third image, the first image may be an image captured first in order of time, and the third image may be an image captured finally in order of time.

In an embodiment, therefore, a rectifying key may be generated based on identification information of the object detected from the first image and identification information of the object detected from the third image, and identification information of the object detected from the second image may be rectified based on the rectifying key. For example, when the same object detected from the first image and the third image by the object detection network is not detected from the second image, the object detection apparatus 100 may determine that the object has not been detected by mistake of the object detection network and may supplement this.

The object detection apparatus 100 may acquire identification information of the object detected from each of the continuous images by the pre-trained object detection network, which may be represented as a box set Bounding boxes (hereinafter referred to as Bboxes) including all bounding boxes of the objects detected from the respective images. At this time, a box set detected from the first image may be represented as a first box set Bboxes1, and i bounding boxes may be generated in the first box set Bboxes1. In the same manner, a box set detected from the second image may be represented as a second box set Bboxes2, and j bounding boxes may be generated in the second box set Bboxes2. In addition, k bounding boxes may be generated in a third box set Bboxes3 detected from the third image.

In the embodiment based on the rectifying key, three continuous images are bound in a sliding window manner, and object loss in the second image or the bounding box of the second image is rectified. However, the present disclosure is not limited thereto. The object detection apparatus 100 may correct identification information of an object detected from any one of three or more images based on identification information of an object detected from each of at least two images, among the three or more images.

In an embodiment, the object detection apparatus 100 may generate, based on similarity between bounding boxes, a final key vector including information of a candidate bounding box to be finally added based on the rectifying key or the tracking key. The final key vector may include information of determination as to whether corresponding objects detected from two different images are the same based on similarity between the bounding boxes.

The object detection apparatus 100 may determine whether the generated candidate bounding box will be added to or merged with a target image, and may rectify the box set Bboxes2 of the second image (identification information of the detected object).

After rectifying Bboxes2, the object detection apparatus 100 may acquire identification information of the rectified bounding box set Bboxes2' as identification information of a first image in the next cycle, may acquire identification information of the third image in the previous cycle as identification information of a second image, may newly acquire identification information of the next continuous image as identification information of a third image, and may perform the next cycle.

Next, the following embodiment describes a method of tracking the result of object detection with respect to a third image, among three continuous images, based on a tracking key vector. A detailed description of content identical to that described above will be omitted.

In an embodiment, the object detection apparatus 100 may generate a tracking key vector as comparison information of bounding boxes, which are results of object detection with respect to three images continuous in order of time by the object detection network. The object detection apparatus 100 may track identification information of the object detected from the third image using a candidate bounding box generated based on the tracking key vector. A method of merging or adding the candidate bounding box is identical to the above-described method.

In an embodiment, identification information of the object detected from the third image may be tracked based on identification information of the object detected from the first image and identification information of the object detected from the second image. For example, when the object detected from the first image and the second image by the object detection network is not detected from the third image, it may be determined that the object has not been detected by the object detection network.

As previously described, the object detection apparatus 100 may generate a final key vector based on similarity between bounding boxes included in the tracking key, and may generate a candidate bounding box based on the final key vector. The final key vector may include information of determination as to whether corresponding objects detected from two different images are the same based on similarity between the bounding boxes.

The object detection apparatus 100 may determine whether the generated candidate bounding box will be added to or merged with a target image, and may track the box set Bboxes3 of the third image (identification information of the detected object).

In an embodiment, the object detection apparatus 100 may track the third box set Bboxes3, and then the object detection apparatus 100 may use the tracked third box set Bboxes3' as identification information of a second image in the next cycle.

In an embodiment, the bounding box set of the first image may be a reference bounding box set, and the result of object detection inferred through the pre-trained object detection network may be output without change. The bounding box set of the second image may be tracked, and the tracked bounding box set may be output. When no more images are input in continuous situations, i.e. when no image next to the third image exists, the bounding box set of the third image may be output. At this time, the result of detection in the previous cycle may be output.

In an embodiment, the object detection apparatus 100 may perform a process after the pre-trained object detection network in FIG. 3. In another embodiment, the object detection apparatus 100 may perform the overall process of acquiring continuous images captured by the camera, detecting an object through the object detection network, and correcting identification information of the object.

When the object detection apparatus 100 performs a process after the object detection network, the object detection apparatus may be implemented as being coupled to the existing pre-trained object detection network as a bunch-of-keys module. That is, the object detection apparatus 100 may receive identification information output from the last identification layer of the object detection network, and may correct the identification layer of the detected object.

In an embodiment, the object detection apparatus 100 may be implemented in an object terminal device (a car, a mobile device, etc.) and/or the server 200. At this time, the server 200 may be a server for operating the object detection system 1 including the object detection apparatus 100 or a server that implements a portion or the entirety of the object detection apparatus 100.

In an embodiment, the server 200 may be a server that captures an image of a specific region in continuous situations, detects an object from the captured image, and, when the detected object is lost in at least one frame, controls the operation of the object detection apparatus 100 with respect to the overall process for correcting the same.

In addition, the server 200 may be a database server that provides data necessary to operate the object detection apparatus 100. Furthermore, the server 200 may include a web server, an application server, or a deep learning network provision server.

In addition, the server 200 may include a big data server and an AI server necessary to apply various artificial intelligence algorithms and a computation server that performs computation of various algorithms.

Also, in this embodiment, the server 200 may include the above-specified servers or may network with the servers. That is, in this embodiment, the server 200 may include the web server and the AI server or may network with the servers.

In the object detection system 1, the object detection apparatus 100 and the server 200 may be connected to each other via the network 300. The network 300 may include wired networks, such as LANs (local area networks), WANs (Wide area networks), MANs (metropolitan area networks), and ISDNs (integrated service digital networks), or wireless networks, such as wireless LANs, CDMA, Bluetooth, and satellite communication. However, the present disclosure is not limited thereto. In addition, the network 300 may transmit and receive information using near field communication or long distance communication.

In addition, the network 300 may include network elements, such as a hub, a bridge, a router, a switch, and a gateway. The network 300 may include one or more connected networks, including a public network, such as the Internet, and a private network, such as a safe private network of a corporation, e.g. a multi-network environment. Access to the network 300 may be achieved through one or more wired or wireless access networks. Furthermore, the network 300 may support IoT (Internet of Things) that transmits, receives, and processes information between dispersed components, such as things, and/or 5G communication.

Figure 4:
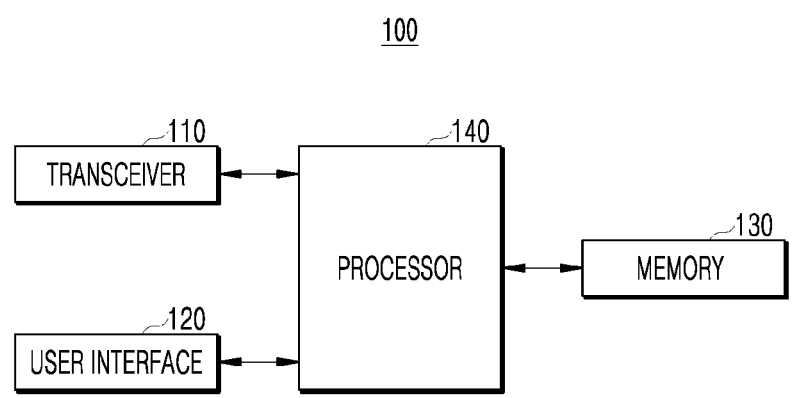
FIG. 4 is a block diagram schematically showing an object detection apparatus according to an embodiment of the present disclosure.

FIG. 4 is a block diagram schematically showing an object detection apparatus according to an embodiment of the present disclosure.

Referring to FIG. 4, the object detection apparatus 100 may include a transceiver 110, a user interface 120, a memory 130, and a processor 140.

The transceiver 110 may be interlocked with the network 300 to provide a communication interface necessary to provide transmission and reception signals between external devices in the form of packet data. In addition, the transceiver 110 may be a device including hardware and software necessary to transmit and receive a signal, such as a control signal or a data signal, to and from another network device through wired or wireless connection.

That is, the processor 140 may receive various data or information from an external device connected via the transceiver 110, and may transmit various data or information to the external device.

In an embodiment, the user interface 120 may include an input interface configured to allow user requests and commands for controlling the operation of the object detection apparatus 100 (e.g. change of parameters of an object detection algorithm and change of learning conditions of the object detection algorithm) to be input therethrough.

Also, in an embodiment, the user interface 120 may include an output interface configured to output object detection results. That is, the user interface 120 may output results based on the user requests and commands. The input interface and the output interface of the user interface 120 may be implemented in the same interface.

The memory 130 is configured to store various kinds of information necessary to control the operation (computation) of the object detection apparatus 100 and to store control software, and may include a volatile or nonvolatile recording medium.

The memory 130 may be connected to at least one processor 140 electrically or via an internal communication interface, and may store code configured to cause the processor 130 to control the object detection apparatus 100 when executed by the processor 140.

Here, the memory 130 may include a non-temporary storage medium, such as a magnetic storage medium or a flash storage medium, or a temporary storage medium, such as RAM. However, the present disclosure is not limited thereto. The memory 130 may include a built-in memory and/or an external memory. The memory 130 may include a volatile memory, such as DRAM, SRAM, or SDRAM, a nonvolatile memory, such as OTPROM (one time programmable ROM), PROM, EPROM, EEPROM, mask ROM, flash ROM, NAND flash memory, or NOR flash memory, a flash drive, such as SSD, a CF (compact flash) card, a SD card, a Micro-SD card, a Mini-SD card, an Xd card, or a memory stick, or a storage device, such as an HDD. In addition, the memory 130 may store information related to an algorithm for performing learning according to the present disclosure. Furthermore, various kinds of necessary information within a range for achieving the object of the present disclosure may be stored in the memory 130, and the information stored in the memory 130 may be received from the server or an external device or may be input by the user so as to be updated.

The processor 140 may control the overall operation of the object detection apparatus 100. Specifically, the processor 140 may be connected to the construction of the object detection apparatus 100 including the memory 130, and may execute at least one command stored in the memory 130 to control the overall operation of the object detection apparatus 100.

The processor 140 may be implemented in various manners. For example, the processor 140 may be implemented by at least one of an application specific integrated circuit (ASIC), an embedded processor, a microprocessor, a hardware control logic, a hardware finite state machine (FSM), and a digital signal processor (DSP).

The processor 140, which is a kind of central processing unit, may drive control software installed in the memory 130 loaded in the memory to control the operation of the object detection apparatus 100. The processor 140 may include all kinds of devices capable of processing data. Here, the "processor" may mean a data processing device, mounted in hardware, having a circuit that is physically structured to perform a function represented by code or commands included in, for example, a program.

In an embodiment, the processor 140 may acquire identification information of an object detected from each of N (N being a preset integer of 3 or more) images from the output of the identification layer of the pre-trained object detection network, and may correct the identification information of the object detected from any one of the N images based on the identification information of the object detected from each of at least two images, among the N images. In addition, the processor 140 may add a newly detected object to the result of the object detected from any one of the N images, or may correct the size of the bounding box of the detected object. At this time, identification information may include, for example, whether the object detected from the image exists, an identification label, an object ID, identification probability, the coordinates of the bounding box, and the size of the bounding box.

In an embodiment, the processor 140 may correct identification information of an object detected from any one image, among three images. To this end, the processor may generate a rectifying key based on the result of comparison between objects detected from two different images, i.e. the first image and the third image, among the three images, and a rectifying key based on the result of comparison between objects detected from the first image and the second image. Alternatively, the processor may generate a tracking key based on the result of comparison between objects detected from the first image and the second image and a tracking key based on the result of comparison between objects detected from the second image and the third image.

The processor 140 may generate a final key vector based on rectifying keys or tracking keys. The final key vector includes information of determination as to whether corresponding objects detected from two different images are the same based on similarity between bounding boxes, as previously described.

In an embodiment, Euclidian distance, feature similarity index color (FSIMc), intersection over union (IoU), generalized intersection over union (GIoU), or complete intersection over union (CIoU) may be used as a method of calculating similarity.

For Euclidian distance, central points Cent1 and Cent2 of network output values Bboxes1 and Bboxes2 of two images may be extracted to calculate Euclidian distance, whereby similarity may be calculated, and remaining data excluding the closest distance data for each row and column may be deleted from a matrix in which all Euclidian distances are calculated, whereby to generate a key vector.

IoU is based on an intersection region between corresponding bounding boxes of images to be compared (a ratio of an intersection to a union of two bounding boxes), GIoU is a method of introducing the area C of a region that wraps all corresponding bounding boxes, and CIoU is a method of introducing the distance between central points of two bounding boxes and a ratio relationship between the two bounding boxes as parameters, instead of C, to increase convergence speed. For FSIMc, network output values (bounding boxes) of two images may be extracted and resized, and images of the same size are compared with each other in the unit of a pixel (including color information) to calculate similarity.

IoU has a value between 0 and 1 like a probability value irrespective of the size of the bounding box. As IoU approximates to 1, it may be determined that a ground truth bounding box and an expected bounding box coincide with each other, whereby prediction is precisely performed. When prediction is completely wrong, on the other hand, there is no overlap, whereby a value of 0 is calculated.

GIoU is an improved algorithm based on IoU. When IoU is 1, it is not possible to know an error between the ground truth bounding box and the expected bounding box. Consequently, a box that wraps the two boxes (a global box) may be made, and similarity may be calculated based thereon. GIoU has a value between −1 and 1.

$$GIoU = IoU - \frac{C \backslash (A \cup B)}{|C|}$$ [Mathematical Expression 1]

Here, C is the area of the smallest box that wraps box A and box B, and C\(A U B) means the area of the remaining region of region C excluding the regions occupied by box A and box B. That is, GIoU may have a range of −1<GIoU<1. When the value of GIoU is −1, therefore, this means that the two boxes are not completely the same. When the value of GIoU is 1, on the other hand, this means that the two boxes are completely the same.

Figure 5:
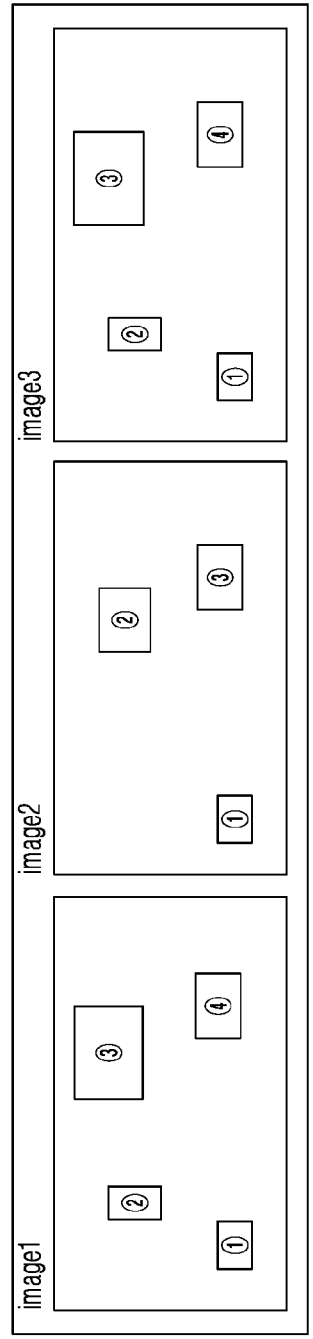
FIGS. 5 and 6 are illustrative views illustrating rectifying-key-based key vector generation according to an embodiment of the present disclosure.
Figure 6:
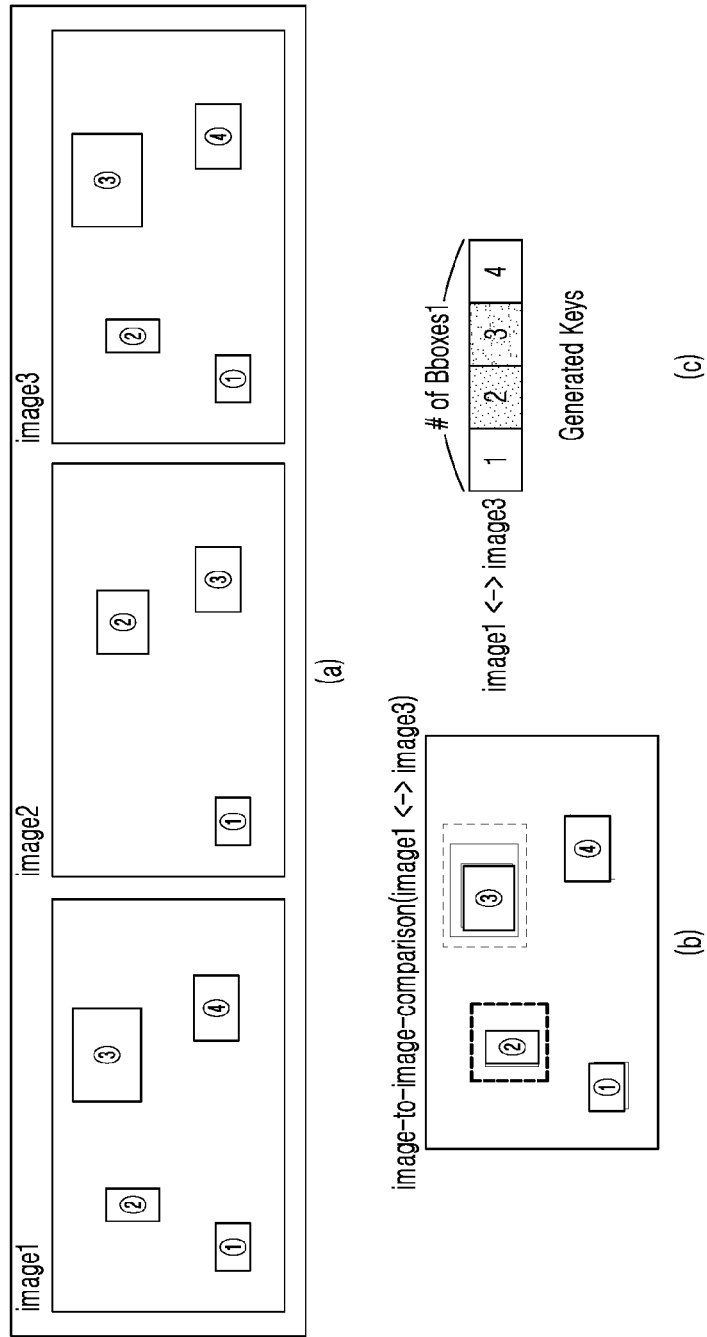

FIGS. 5 and 6 are illustrative views illustrating a method of generating rectifying keys according to an embodiment of the present disclosure. Specifically, FIG. 5 shows a rectifying key (vector) that determines whether objects detected from a first image and a second image are the same through comparison in similarity therebetween according to an embodiment, and FIG. 6 shows a rectifying key (vector) that determines whether objects detected from a first image and a third image are the same through comparison in similarity therebetween.

In an embodiment, it may be determined whether bounding boxes are the same between Bboxes1 and Bboxes2 and between Bboxes1 and Bboxes3 based on a first image, i.e. Bboxes1. That is, it may be determined whether objects detected from respective images are the same.

The object detection apparatus 100 may determine whether objects are the same depending on similarity calculated based on Euclidian distance, IoU, FSIMc, GIoU, or CIoU to generate rectifying keys shown in FIGS. 5 and 6. In the rectifying key vector of FIGS. 5 and 6, the element of each column may mean box ID in Bboxes1. When there are no matching bounding boxes (false), the rectifying key vector may be indicated as 0.

Figure 7:
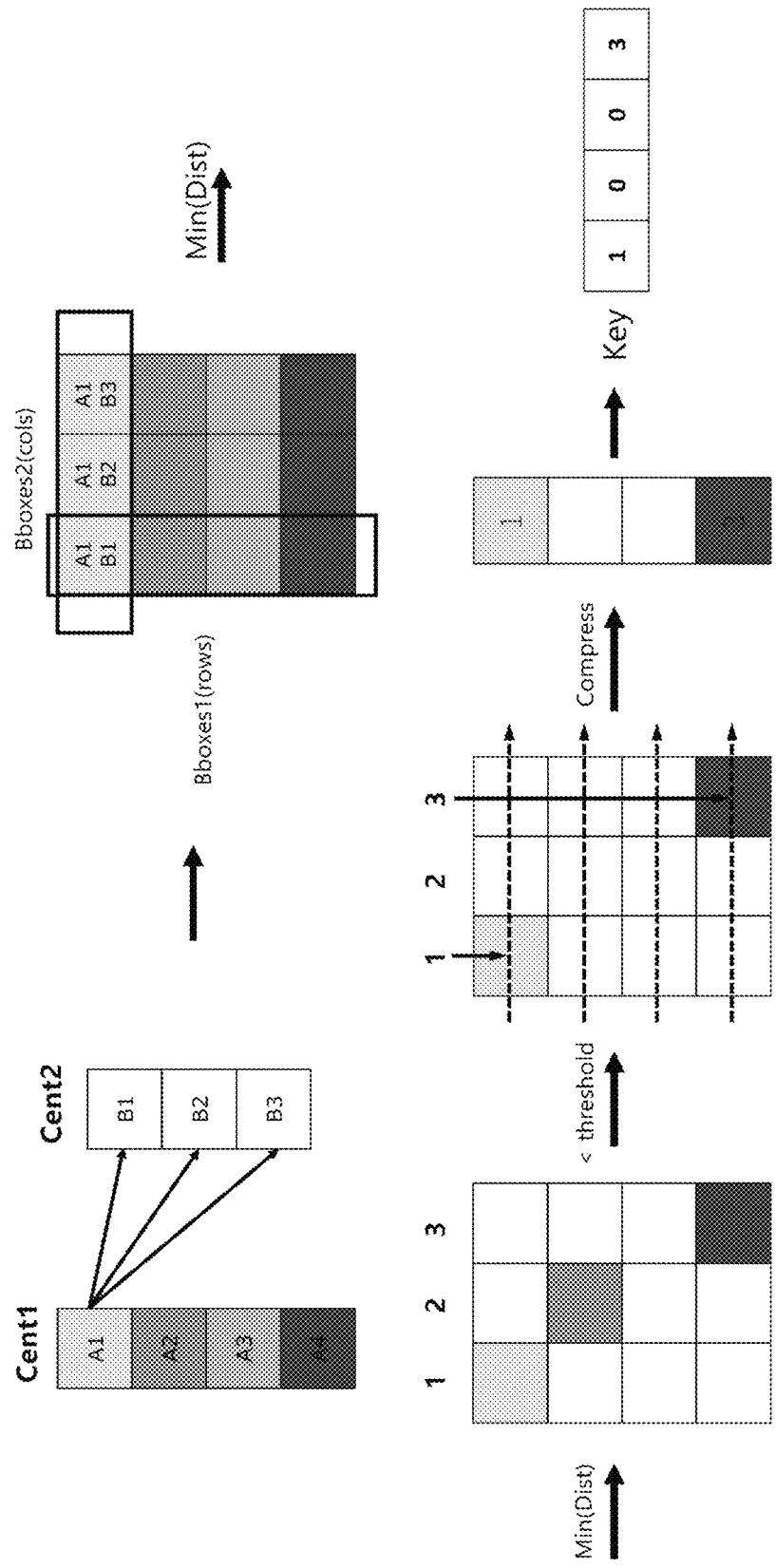
FIG. 7 is an illustrative view of Euclidian-distance-based key vector generation according to an embodiment of the present disclosure.

Hereinafter, a method of generating a final key vector will be described in detail with reference to FIG. 7. FIG. 7 illustrates generation of a final key vector using similarity calculated based on Euclidian distance. Even when other similarities are used, the final key vector may be generated in the same manner.

Referring to FIG. 7, the processor 140 may calculate similarity with respect to all combinations of bounding boxes detected from two images to generate a matrix. For example, the processor 140 may generate a matrix having results of calculation of similarity between all combinations of objects A1, A2, A3, and A4 detected from a first image and objects B1, B2, B3, and B4 detected from a second image (or corresponding combinations) as elements. A first row of a matrix of the right upper end of FIG. 7 shows results of calculation of similarity between the object A1 detected from the first image and the objects B1, B2, and B3 detected from the second image, and a second row shows results of calculation of similarity between the object A2 detected from the first image and the objects B1, B2, and B3 detected from the second image.

Subsequently, only an element having the smallest Euclidian distance ((min(Dist)) in each row is left, and elements having Euclidian distances greater than a reference value (a critical value), among the left elements, are deleted from each row. Columns of the elements that finally exist in the matrix are merged to generate a final key vector. When merging the columns, the object detection apparatus 100 may set column numbers to elements of the final key vector. When the final key vector is generated based on GIoU, only an element having the highest value of GIoU in each column may be left, and when the final key vector is generated based on other methods, the same is equally applied.

An embodiment of a method of generating a key vector based on GIoU may be represented as code shown in Table 2.

TABLE 2

Key generation code

\# Compare Bounding boxes in Image1 with Bounding boxes in Image2
GIoU = GIoU(Bboxes1, Bboxes2)

TABLE 2-continued

Key generation code

```
# Extract maximum values from rows and columns
    GIoU_max_column = column_max(GIoU)
    GIoU_max_row = row_max(GIoU)
# Except for the maximum value in GIoU, all other elements are filled with 0
    for c(column number) is 1 to end
        for r(row number) is 1 to end
            if cth data of GIoU_max_column is equal to rth data of GIoU_max_row
                GIoU_key(r,c) = GIoU(r,c)
            else
                GIoU_key(r,c) = 0
            end
        end
    end
# Only elements greater than 0 and less than the threshold are converted to 1.
    GIoU = (GIoU_key > 0) and (GIoU_key < GIOU_THRESHOLD)
# In the GIoUmatrix, an element with a value of 1 is replaced with a number
corresponding to each column number, the row of the GIoU matrix matches
Bboxes1 and the column matches Bboxes2.
    for I is 1 to the number of bounding boxes1
        for j is 1 to the number of bounding boxes2
            if GIoU(i, j) == 1
                key_sav(i, j) = j;
            else
                key_sav(i, j) = 0;
            end
        end
    end
# key_sav matrix is compressed into a one-column vector. The column number
with the index of the element 1 is stored in the created vector, the index number of
the vector is the same as the number of Bboxes1, and the data of the element is
the same as the number of Bboxes2.
    KEY1 = column_max(key_sav)
```

Figure 8:
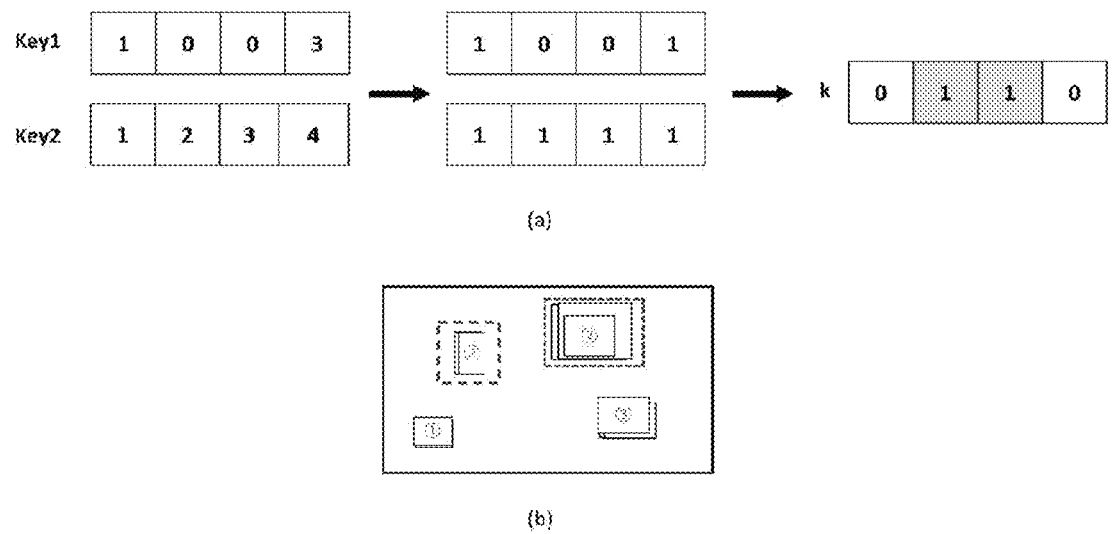
FIG. 8 is an illustrative view illustrating candidate box determination according to an embodiment of the present disclosure.
Figure 9:
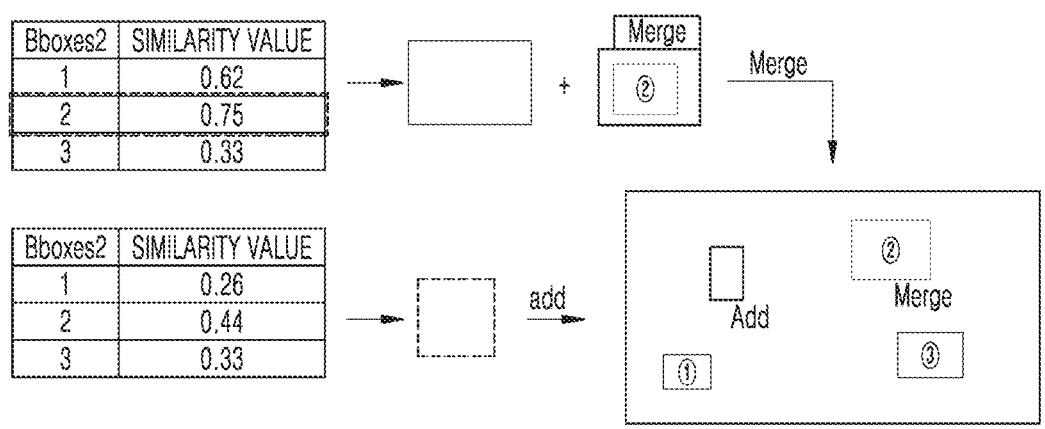
FIG. 9 is an illustrative view illustrating object detection correcting method determination according to an embodiment of the present disclosure.

FIG. 8 is an illustrative view illustrating a method of determining a candidate bounding box according to an embodiment of the present disclosure, and FIG. 9 is an illustrative view illustrating a method of correcting the result of object detection according to an embodiment of the present disclosure. The same may be applied to all rectifying keys or tracking keys.

The processor 140 may determine a final key vector k meaning a candidate bounding box for rectifying identification information of an object detected from a second image based on a first key vector (a key vector of FIG. 5) key1 and a second key vector (a key vector of FIG. 6) key2. The processor 140 may add the candidate bounding box k to the second image or may merge the candidate bounding box k with a bounding box for an object detected from the second image based on second similarity between the candidate bounding box k and the bounding box for the object detected from the second image.

Referring to (a) of FIG. 8, first, the processor 140 may change values greater than 0 to 1 in the generated key vectors key1 and key2 to generate a key vector consisting of 0 and 1. For the first key vector and the second key vector each consisting of 0 and 1, the processor 140 may calculate values greater than 0 when subtracting the first key vector from the second key vector to be 1 (true value) to generate a final key vector k, which is a candidate bounding box. This means that bounding boxes corresponding to column numbers having 1 (true) of the final key vector k as elements exist in other images but do not exist in a target image (a second image when the rectifying key is used; a third image when the tracking key is used) or that similarity is low. That is, in this embodiment, as shown in (b) of FIG. 8, a second box portion at the left upper end and a second box portion at the right upper end may be determined to be a candidate bounding box.

In an embodiment, the processor 140 may determine whether the candidate bounding box will be merged with the existing bounding box of the target image or will be newly added. Merging of the candidate bounding box may prevent lowering of object detection performance as the result of the same object being doubly detected from different bounding boxes due to addition of the candidate bounding box even through the same object exists.

A method of the processor 140 determining whether to merge the candidate bounding box with the existing bounding box of the target image or to newly add the candidate bounding box will be described with reference to FIG. 9.

In an embodiment, second similarity between the candidate bounding box and objects detected from the target image may be calculated to determine whether to add or merge the candidate bounding box.

In an embodiment, second similarity may be based on any one of the similarity calculation methods described above.

In another embodiment, second similarity may be based on CIoU, which more sensitively reflects the relationship between boxes.

As previously described, CIoU is a method of additionally reflecting a ratio of the bounding boxes, as a parameter, in GIoU, in which the distance between the bounding boxes (actually, area is used) is introduced to IoU. CIoU may be a reference based on which the relationship between the bounding boxes is more sensitively defined than GIoU. CIoU may be calculated as follows.

$$CIoU = 1 - IoU + \frac{\rho(b, b^{gt})}{c^2} + \alpha \upsilon \quad \text{[Mathematical Expression 2]}$$

Here, Alpha a is a trade-off parameter, and Upsilon u is a parameter for indicating continuity in an aspect ratio of a box.

In an embodiment, the processor 140 may calculate second similarity between the candidate bounding box and all bounding boxes of the target image. When a bounding box having similarity equal to or greater than a critical value exists in the target image, the processor 140 may determine that the same object exists in the target image, and may merge the candidate bounding box with a bounding box matched based on second similarity of the target image without addition of the candidate bounding box.

In an embodiment, when merging is performed, the processor 140 may merge the bounding box corresponding to the target image and the candidate bounding box using linear interpolation. For example, when the candidate bounding box is small, the processor 140 may determine the bounding box corresponding to the target image to be small. When the candidate bounding box is large, on the other hand, the processor may determine the bounding box corresponding to the target image to be large. As a result, it is possible to prevent lowering of frames per second (FPS). The merging method is not limited to linear interpolation.

In an embodiment, when an object having second similarity equal to or greater than the critical value does not exist in the target image, the object may be determined to be an object that has not been detected by the object detection network (a lost object), the candidate bounding box may be added to the target image, thus improving average precision (AP). In an embodiment, the object detection apparatus 100 may derive an optimized value of the critical value of first similarity for comparing bounding boxes of the rectifying key or the tracking key or the critical value of second similarity for generating the final key vector.

Figure 14:
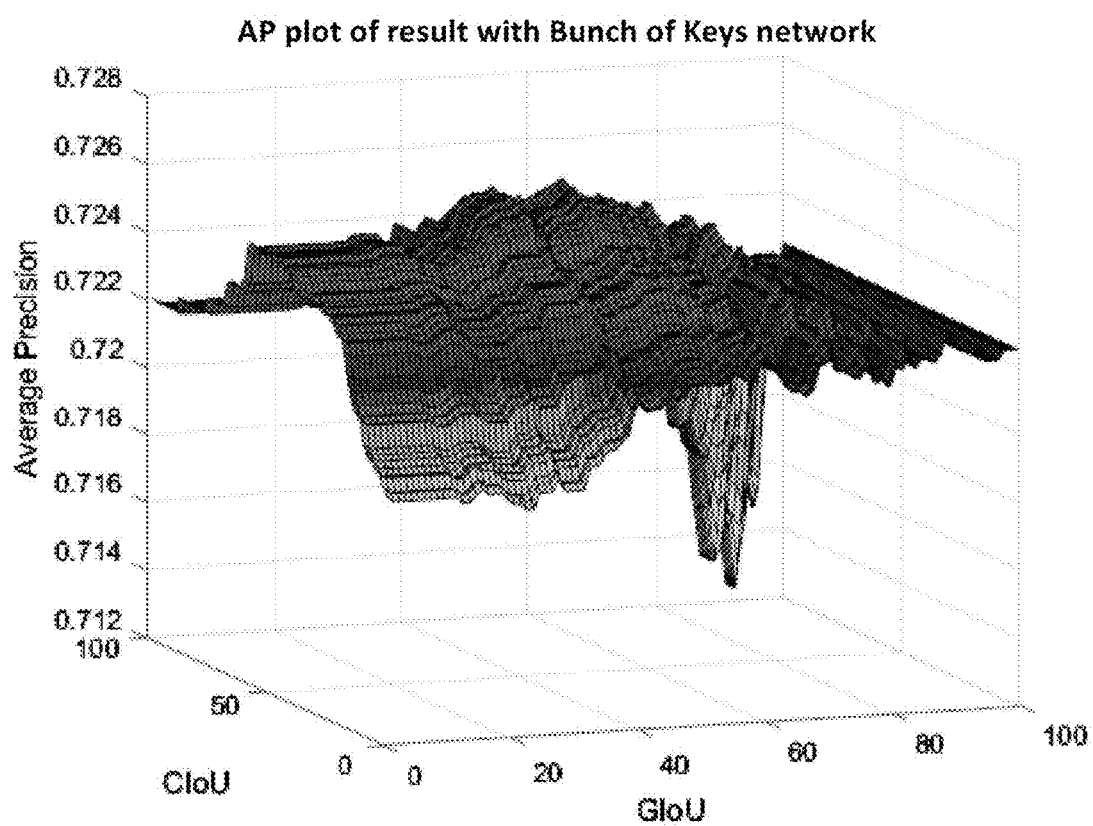
FIG. 14 is a graph showing distribution of average precision (AP) when combinations of similarity calculation methods are used for each of first similarity and second similarity.

For example, the processor 140 may derive optimized values of the critical value of first similarity and the critical value of second similarity focusing on the form of the result of experiments of average precision (AP) based on a change in the critical value of first similarity and the critical value of second similarity as shown in FIG. 14.

That is, the object detection apparatus 100 may use kernel search in order to determine the critical value of first similarity and the critical value of second similarity having an AP value that is the global maximum.

Figure 16:
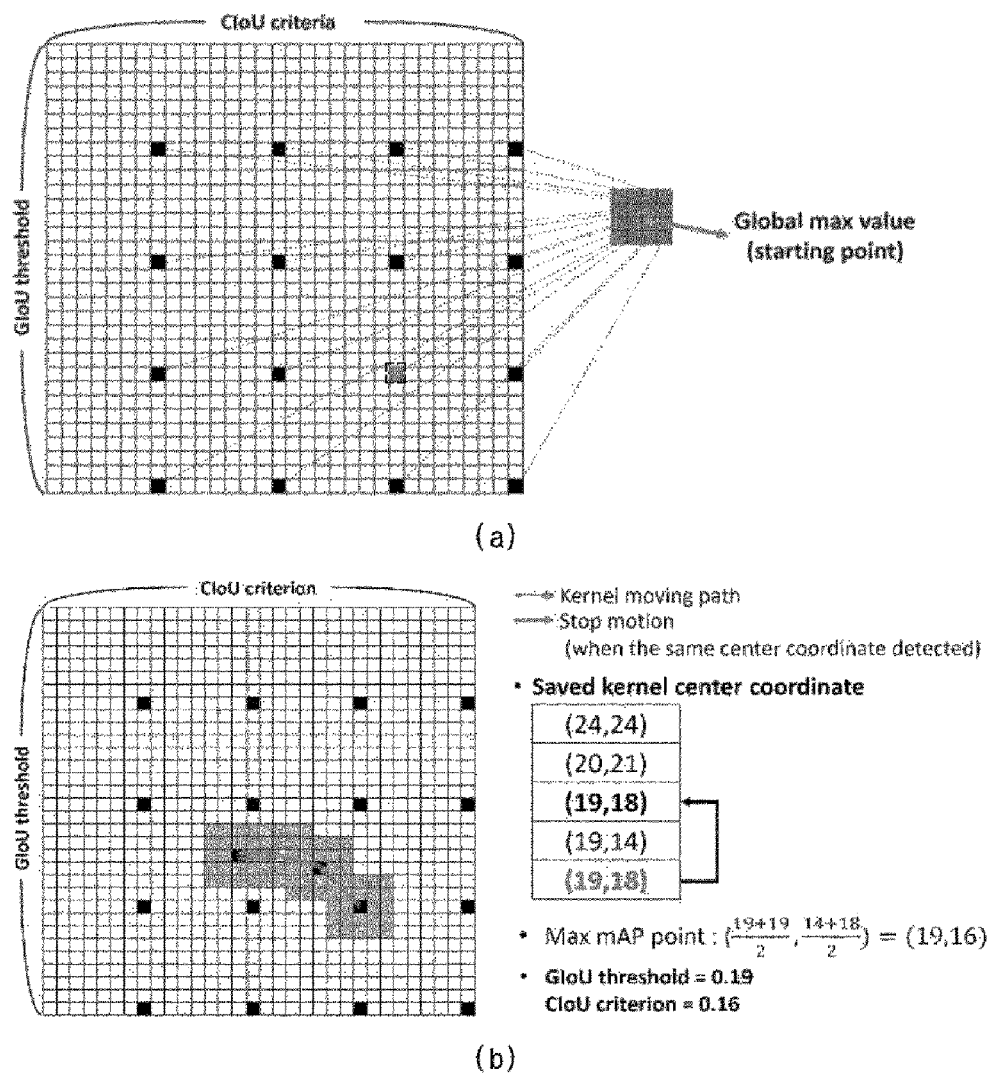
FIG. 16 is an illustrative view illustrating a GIoU and CIoU critical value optimization method according to an embodiment of the present disclosure.

That is, the processor 140 may set a matrix having a CIoU critical value and a GIoU critical value as index values of a row and a column, respectively, as shown in FIG. 16, in order to determine optimized values of the critical value of first similarity and the critical value of second similarity. Subsequently, the processor 140 may extract matrix values in a specific unit, and may search for precision based on the CIoU critical value and the GIoU critical value corresponding to the element by a preset kernel size at the point having the highest value of the global search results. The processor 140 may acquire all precision data in the kernel, and may move the center of the kernel toward the highest precision value. When kernel center coordinates move from coordinates stored in the previous cycle while existing in a maximum value vector having four identical values stored therein, further tasks may be interrupted, the average of the previous center coordinates and the current center coordinates may be derived as the maximum value of precision, and the CIoU critical value and the GIoU critical value corresponding to the precision may be determined to be an optimized CIoU critical value and an optimized GIoU critical value, respectively.

In an embodiment, in an optimized matrix, the object detection apparatus 100 may calculate precision (and the CIoU critical value and the GIoU critical value based thereon) in the state in which a process for the tracking key and a process for the rectifying key are combined with each other, or may calculate precision (and the CIoU critical value and the GIoU critical value based thereon) in the state in which the processes are individually separated from each other. That is, optimization may be performed for each of the tracking key and the rectifying key or in a combined state thereof, and different critical values may be applied to the GIoU critical value and the CIoU critical value at the time of tracking and rectification.

In an embodiment, when the CIoU critical value and the GIoU critical value are set once, the critical values may be used without additional computation. At this time, GIoU critical value may be expressed as a threshold, and the CIoU critical value may be expressed as a criterion. However, these terms are used in order to distinguish between GIoU and CIoU, and may mean critical values used as a reference.

In another embodiment, the optimized values of the critical value of first similarity and the critical value of second similarity may be set based further on an image capturing environment and classes of detected objects.

Also, in an embodiment, similarity may be based on morphological information of objects detected from a first image, a second image, and a third image, and may be based further on color information of the objects detected from the first image, the second image, and the third image. Here, morphological information may include the coordinates, size, and area of a bounding box.

Also, in an embodiment, when identification information of an object detected from the third image is tracked, identification information of the object detected from the third image may be tracked based on similarity between detected objects that exist in the region corresponding to a preset region factor, among the first image, the second image, and the third image. That is, in an embodiment, the object detection apparatus 100 may perform detection region filtering such that object detection is possible within a set region of an image having a region factor reflected therein.

At this time, the region factor may be differently set based on an image capturing environment and classes of detected objects. Also, in an embodiment, the region factor may be set in inverse proportion to the movement speed of a camera that has captured N images. For example, when the speed of a vehicle to which the camera is mounted is increased, the region factor may be reduced.

In an embodiment, for example, there is a high probability of an environment utilizing a network being an environment that is guaranteed to some extent, such as an expressway, but the network must be utilized in various environments, such as an environment in which there are a lot of people. In this case, since characteristics that datasets have in respective environments may be different from each other, the network may be utilized when generating a key with a critical value calculated in advance according to dataset for such environments.

That is, in an embodiment, a critical value preset depending on an environment may be stored, and when the environment is recognized, change to the critical value preset for the environment is possible. In other words, for example, when a learning model according to an embodiment is applied to a car, the movement speed of the car may be sensed, and a preset critical value may be loaded to set an environment. In addition, GPS may be utilized, or a deep learning network layer capable of sensing an environment may be utilized. For example, the current situation may be estimated from a captured image, i.e. whether the current driving environment is an environment of a car running on a road or an environment of a car driving downtown may be estimated, based on a network that picks out context, among deep learning networks.

In an embodiment, a critical value may be set based on information about such an environment. Also, in an embodiment, the critical value may be differently set depending on the class of an object, which is a target to be photographed, as well as the environment. For example, the kind (class) of the object may be a car, a bicycle, an airplane, or a pedestrian, and since the movement speeds of objects in captured images are different from each other depending on classes, the critical value may be differently set depending on the speed of the target to be photographed. At this time, in an embodiment, when a key is generated, the key may be generated for each class, and a critical value based on the class (kind) of the object recognized at the time of optimization may be loaded. Meanwhile, in an embodiment, not only the optimization but also the region factor may be changed depending on the environment. For example, when there are a lot of objects having high moving speeds in a specific direction, the region factor may be set to be smaller (e.g. less than 0.8) by reflecting a large amount of movement. In addition, when applied to continuous images captured by a camera having a high photographing speed (higher fps), the region factor may be set to be slightly larger (e.g. greater than 0.8). That is, the region factor may be proportional to fps, and may be inversely proportional to movement speed in the image of the target to be photographed. Also, as previously described, the region factor may also be differently set depending on the class (kind) of the target to be photographed (objected to be detected).

That is, in an embodiment, for the GIoU critical value and the CIoU critical value at the time of optimization and the region factor at the time of filtering, values based on environments and classes may be stored in advance, and a value corresponding to the actual driving environment and the class may be loaded and utilized.

Figure 10:
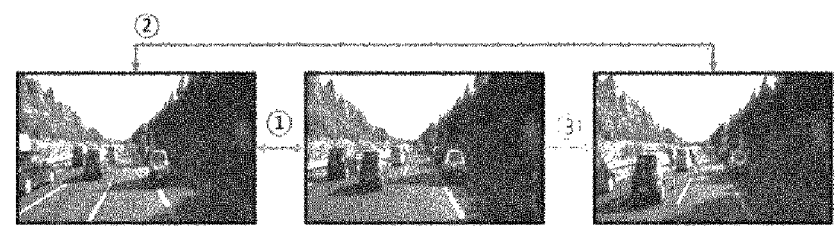
FIG. 10 is an illustrative view illustrating rectifying-key and tracking-key-based key vector generation according to an embodiment of the present disclosure.
Figure 10:
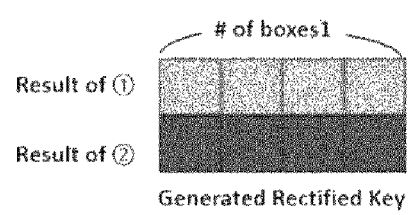
Figure 10:
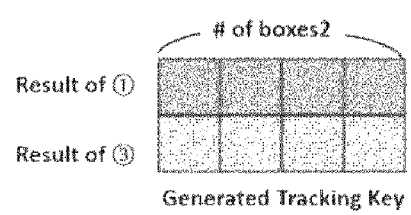
Figure 12:
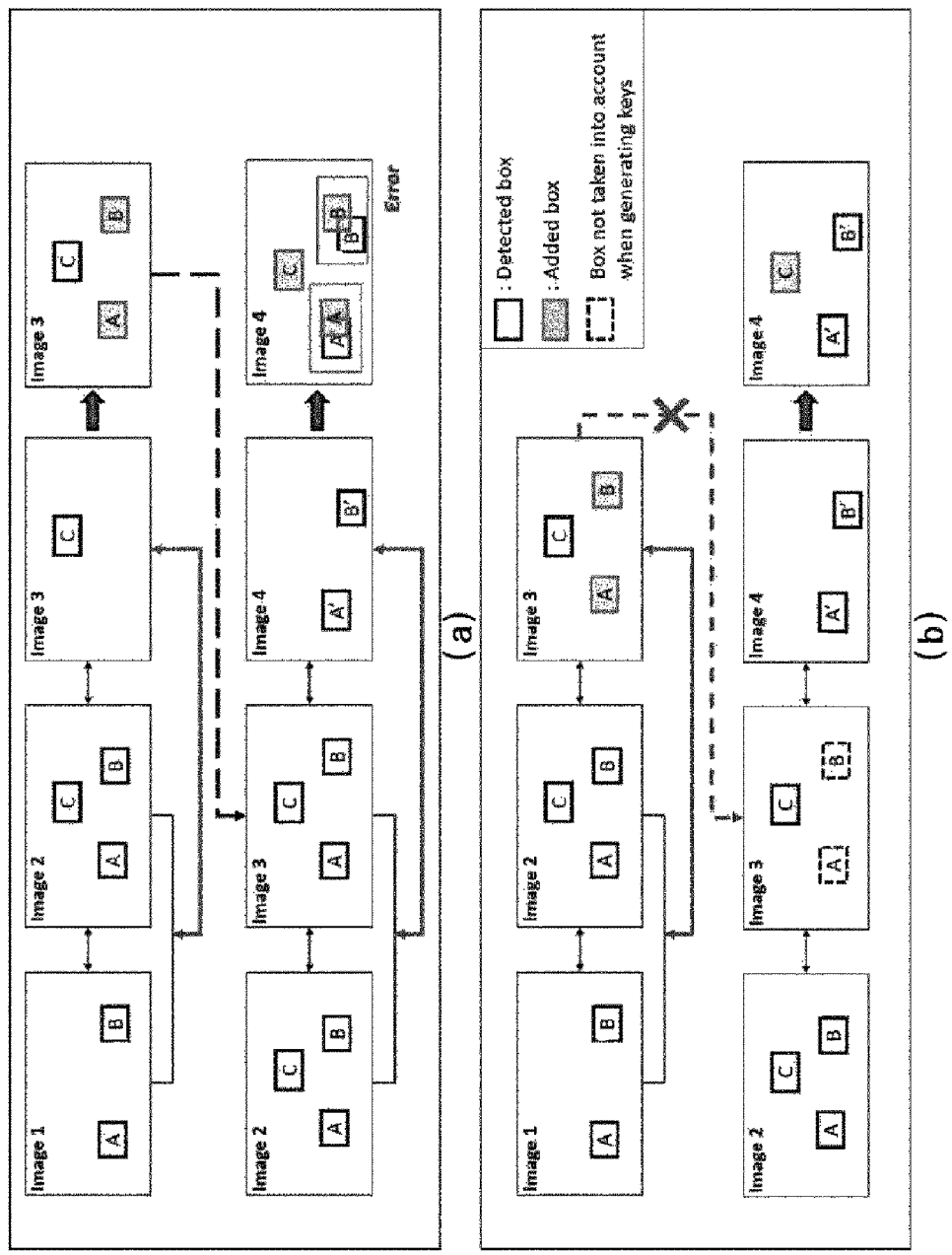
FIG. 12 is an illustrative view illustrating rectifying-key and tracking-key-based object detection correcting method determination according to an embodiment of the present disclosure.

FIG. 10 is an illustrative view illustrating a method of generating both a rectifying key and a tracking key according to an embodiment of the present disclosure, FIG. is an illustrative view illustrating a method of determining a candidate bounding box using both a rectifying key and a tracking key according to an embodiment of the present disclosure, and FIG. 12 is an illustrative view illustrating a method of tracking the result of object detection (addition or merging) using a tracking key according to an embodiment of the present disclosure.

An object detection method using a rectifying key and a tracking key will be described with reference to FIGS. 10 to 12. A detailed description of content identical to that described above will be omitted.

The processor 140 may compare results of detection with respect to three continuous images A, B, and C shown in (a) of FIG. 10 with each other to generate a key. Also (b) of FIG. 10 shows a generated rectifying key, and the number of columns of the generated rectifying key vector may be equal to the number of bounding boxes of a bounding box set A sensed from the image A (bounding boxes sensed from the image A, which may be referred to as Bboxes A). Also (c) of FIG. 10 shows a generated tracking key, and the number of columns of the generated tracking key vector may be equal to the number of bounding boxes of a bounding box set B sensed from the image B (bounding boxes sensed from the image B, which may be referred to as Bboxes B).

In (a) of FIG. 10, arrows indicate comparison between sensed bounding boxes. In (b) of FIG. 10, the rectifying key is generated through the relationship between a first arrow (Bboxes A↔Bboxes B) and a second arrow (Bboxes A↔Bboxes C). In the same manner, in (c) of FIG. 10, the tracking key is generated in consideration of the relationship between the first arrow (Bboxes A↔Bboxes B) and a third arrow (Bboxes B↔Bboxes C).

For the rectifying key, the size of a matrix indicating the relationship between the bounding boxes is defined by an (i×j) matrix and an (i×k) matrix. For the tracking key, the size of a matrix indicating the relationship between the bounding boxes is defined by a (j×i) matrix and a (j×k) matrix. An element having the maximum similarity between bounding boxes corresponding to each row and column of each matrix may be filtered as a preset critical value of similarity, and the matrix may be compressed based on the column to generate a final key vector.

In an embodiment, similarity may be GIoU. Since GIoU values are compared with each other to seven decimal places, there is a very low probability of different elements having the same GIoU value. When two or more elements having the highest score are sensed, however, a bounding box having the closest midpoint distance may be determined to a candidate bounding box. When the bounding boxes have the same midpoint distance, an arbitrary bounding box, among the bounding boxes having the same GIoU value, may be determined to be a candidate bounding box.

In other words, in (a) of FIG. 10, a first row of the generated key (it is indicated as "Result of ①" in (b) of FIG. 10) is a first rectifying key vector generated as the result of comparison between the image A and the image B, and a second row (it is indicated as "Result of ②" in (b) of FIG. 10) is a second rectifying key vector generated as the result of comparison between the image A and the image C.

Also, in (c) of FIG. 10, a first row is a first tracking key vector generated as the result of comparison between the image B and the image A, and a second row is a second tracking key vector generated as the result of comparison between the image B and the image C. In an embodiment, the first rectifying key vector and the first tracking key vector are matrices generated from the same matrix (comparison between the image A and the image B) but may be compressed in different directions depending on the purpose thereof.

Figure 11:
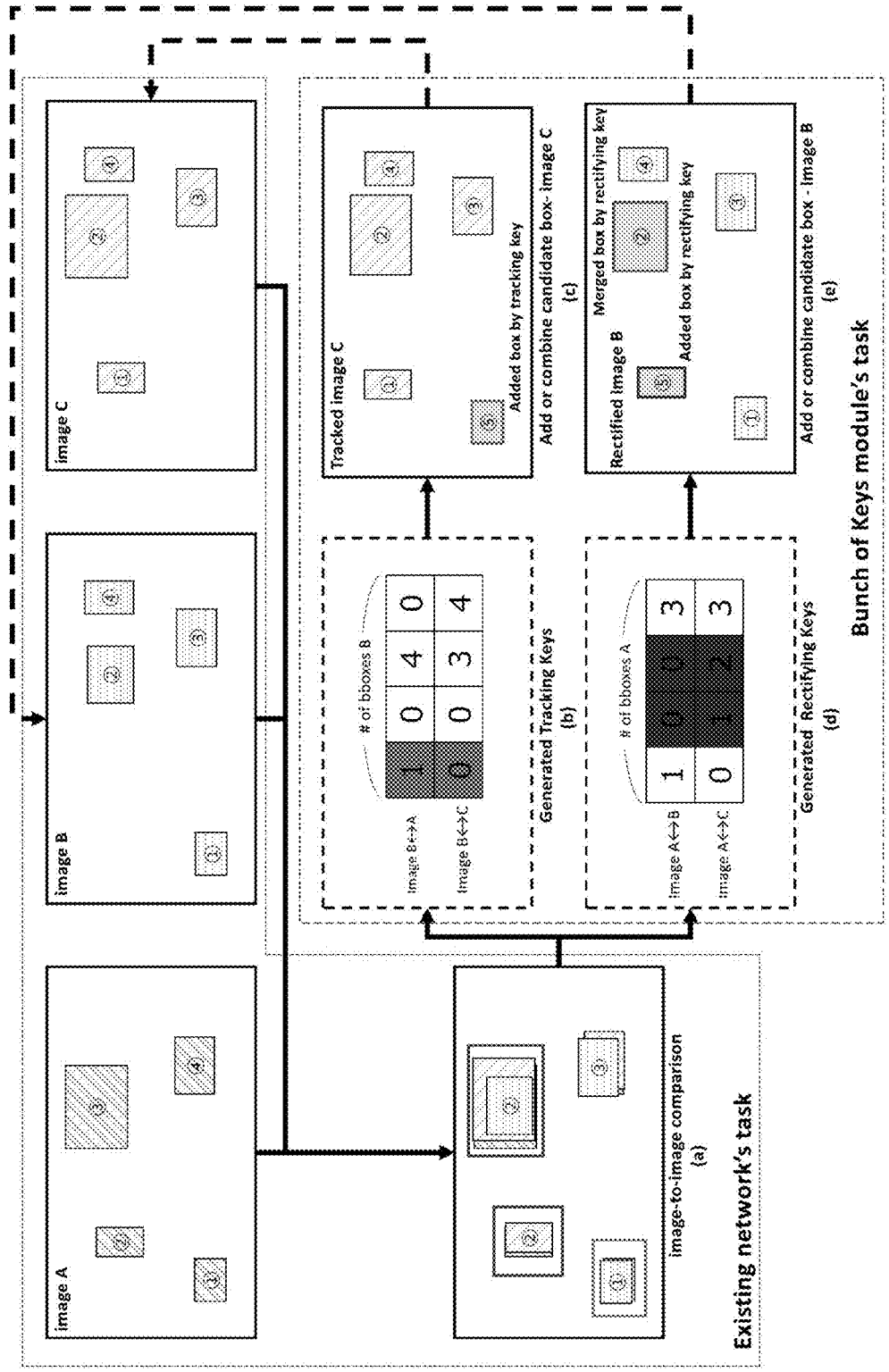
FIG. 11 is an illustrative view illustrating rectifying-key and tracking-key-based candidate box determination according to an embodiment of the present disclosure.

FIG. 11 is an illustrative view illustrating a method of correcting the result of object detection by a key generation and object detection network, wherein three continuous images may be processed in a sliding window manner. A target to be corrected is an image B for a rectifying key and an image C for a tracking key.

Referring to (a) of FIG. 11, each of bounding boxes detected by the object detection network may include coordinates information and size information of the box, and may be used for comparison in similarity between the bounding boxes. In (a) of FIG. 11, A candidate bounding box for a rectifying key vector may be generated based on the bounding boxes in the border regions shown at left upper end and right upper end, and a candidate bounding box for a tracking key vector may be generated based on the bounding boxes in the border region shown at left lower end.

Referring to (b) and (d) of FIG. 11, bounding boxes matched with each other using key vectors may be determined. Referring to (c) and (e) of FIG. 11, identification information of a detected object may be corrected. When a bounding box already exists at the position at which a candidate bounding box of a target image will be added, the candidate bounding box may be merged with the existing bounding box. Otherwise, the candidate bounding box may be added to the target image.

In the generated rectifying key vector, each column number may be a bounding box number ID of a corresponding bounding box detected from the image A. When the number of bounding boxes detected from the image A is four, the number of columns of the rectifying key vector is four.

A method of generating a final key vector is the same as the description given with reference to FIG. 8.

In an embodiment, in a bounding box of the tracking key vector, bounding boxes in the images A and B matched with each other may not exist in the image C. The case in which bounding boxes in the images A and B matched with each other do not exist in the image C may include any one of 1) the case in which the target object has disappeared from the image C, 2) the case in which the target object is hidden by another object, and 3) the case in which the target object in the image C has not been correctly sensed.

In the first and second cases, when a bounding box is added to the image C, an object may be falsely detected.

In order to solve this, in an embodiment, a region factor may be used as a solution to the first case. For example, when the region factor is set to 0.8, setting may be made such that the tracking key can function only in 80% of the central region of the image. In addition, a description given with reference to FIG. 12 may solve the second case. Since no bounding box is sensed in the third case, a bounding box, e.g. bounding box No. 5 of (c) of FIG. 11, may be added to the image C, thus improving network performance.

Another embodiment of the tracking key vector will be described with reference to FIG. 12.

When the point of view of the camera is abruptly changed or when an object horizontally moving very fast is detected, an error in object detection may occur if the bounding box added by the tracking key in the previous cycle is used to generate a tracking key in the next cycle, and the error may be continuously accumulated.

When such an error is solved using an image comparison algorithm, serious lowering of FPS may occur.

For example, in a first loop of (a) of FIG. 12, the tracking key vector may add two candidate bounding boxes Box A and Box B to a "image 3". The bounding boxes Box A and Box B added in the first loop may be matched with Box A and Box B of a "image 2" in a second loop, whereby a tracking key may be generated. However, when the position of the object is abruptly changed, as in a "image 4", Box A and Box B may be determined to be different from Box A' and Box B' of the "image 4", and Box A and Box B may be added. In this case, the bounding boxes are doubly generated, and therefore precision is lowered.

In an embodiment, therefore, the processor 140 may not consider the bounding box generated in the previous loop in the tracking key generation step. As shown in FIG. 12(b), Box A and Box B added in the first loop may not be considered in the second loop, and only Box C of the third image may be matched and added to the "image 4" in the tracking key. Consequently, it is possible to prevent error accumulation that may occur when the tracking key is used through even a small amount of calculation.

Meanwhile, when a final key vector is generated using only position (coordinates and size) information of the bounding box, the case in which the same kind of another object is sensed at the same position may not be distinguished. Consequently, a more precise final key vector may be generated based on color information of the object.

In an embodiment, the processor 140 may delete matching information of the same objects matched with each other even though the objects have different kinds of color information using color (e.g. RGB values of a pixel) information of the bounding box.

In an embodiment, the processor 140 may calculate and store the average RGB values of each bounding box, and may calculate Euclidian distance of the RGB values between the matched bounding boxes. If the Euclidian value is greater than half of the maximum value that a 8-bit image pixel may have, the processor 140 may delete matched key connection. However, a concrete method using color information is not limited thereto.

Figure 13:
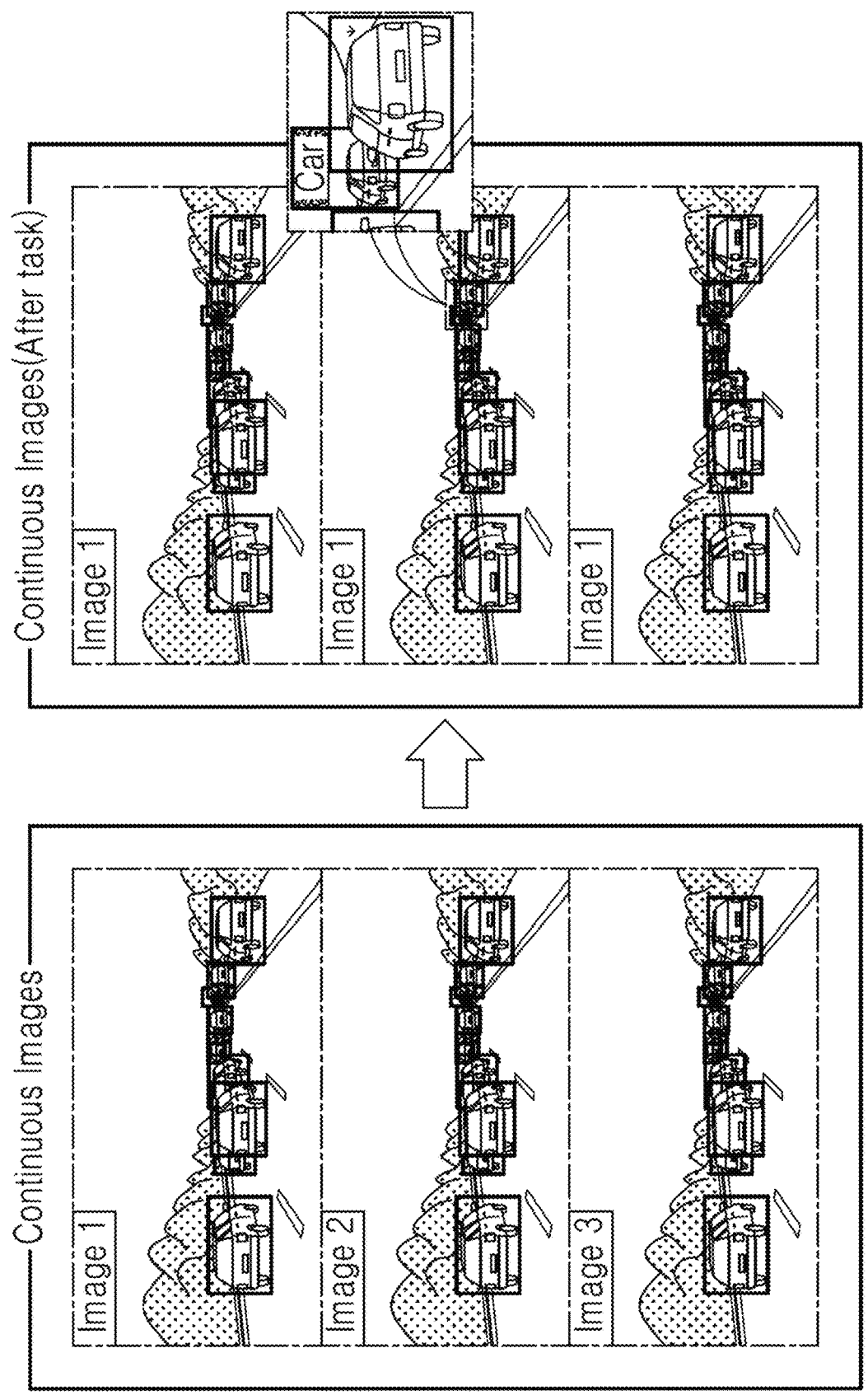
FIG. 13 is an illustrative view showing object detection correcting results according to an embodiment of the present disclosure.

FIG. 13 is an illustrative view showing object detection correcting results according to an embodiment of the present disclosure.

In an embodiment, experiments were performed in order to verify performance of the object detection apparatus 100. Two experiments may be performed. The two experiments may check an optimal bounding box comparison algorithm and determine improvement in network performance.

In the first experiment, it is possible to check which algorithm combination is effective when a key mapping and correcting task is performed.

In the second experiment, improvement in performance of a network trained with various kinds of objects (a car, a person, and a truck) using the algorithm combination verified in the first experiment may be shown.

The experiments were performed using MATLAB 2021a in an environment in which an AMD Ryzen 7 3700X was used as a central processing unit (CPU), an RTX 3090 was used as a graphics processing unit (GPU), and 128 GB of RAM was used. Each network was trained using datasets provided by KITTI and COCO, and learning options for each network were as follows: an initial learning rate of 0.001, a learning rate drop factor of 0.01, a learning rate drop period of 5, a mini-batch size of 16, and a maximum number of epochs of 120.

At this time, in an embodiment, only the rectifying key was used in order to shorten experiment time, and the 0020 dataset of the KITTI tracking dataset was used as a test dataset. In the experiments, the bounding box that should not be sensed in the existing ground truth was deleted (for example, the portion that was hidden by a vehicle and thus not visible or the sensed portion of the object that already left the image).

TABLE 3

| Network | Method | Average precision | Improvement | Frames per second |
|---|---|---|---|---|
| ResNet50 & YOLOv2 [17] | — | 57.99 | — | 41.1 |
|  | Dist & FSIMc [14] | 58.00 | 0.02% | 24.0 |
|  | Dist & CIoU [12] | 58.17 | 0.31% | 39.3 |
|  | IoU & FSIMc [14] | 58.00 | 0.02% | 10.6 |
|  | GIoU [11] & CIoU [12] | 58.39 | 0.69% | 38.4 |
| ResNet101 & YOLOv2 [17] | — | 72.25 | — | 31.7 |
|  | Dist & FSIMc [14] | 72.49 | 0.33% | 20.2 |

TABLE 3-continued

| Network | Method | Average precision | Improvement | Frames per second |
|---|---|---|---|---|
| | Dist & CIoU [12] | 72.62 | 0.51% | 30.8 |
| | IoU & FSIMc [14] | 72.39 | 0.19% | 7.22 |
| | GIoU [11] & CIoU [12] | 72.63 | 0.53% | 30.3 |
| ResNet50 & SSD [10] | — | 41.61 | — | 35.2 |
| | Dist & FSIMc [14] | 41.74 | 0.31% | 23.1 |
| | Dist & CIoU [12] | 41.73 | 0.29% | 29.3 |
| | IoU & FSIMc [14] | 41.70 | 0.22% | 6.84 |
| | GIoU [11] & CIoU [12] | 41.88 | 0.65% | 33.43 |
| ResNet101 & SSD [10] | — | 50.32 | — | 28.6 |
| | Dist & FSIMc [14] | 50.61 | 0.58% | 22.4 |
| | Dist & CIoU [12] | 50.53 | 0.42% | 28.3 |
| | IoU & FSIMc [14] | 50.47 | 0.30% | 10.3 |
| | GIoU [11] & CIoU [12] | 50.81 | 0.97% | 27.9 |

Table 3 shows the results of classification of continuous images using only the rectifying key for the object detection apparatus 100 according to the embodiment. Since the test dataset was photographed in a car driving environment, real-time sensors (e.g. YOLO and SSD, which are real-time detection networks) may be used. YOLOv2 and SSD provided by MATLAB were used as reference networks, and ResNet50 and ResNet101 were used as backbones.

In an experiment according to an embodiment, an algorithm, such as Euclidian distance, IoU, FSIMc, GIoU, or CIoU, was coupled and used as a filter for key mapping and addition/merging determination.

It can be seen from an experiment according to an embodiment that, when GIoU and CIoU filters were applied to ResNet101 and YOLOv2, the highest AP was recorded. In this case, FPS was reduced by about 4.4% (from 31.7 to 30.3). Consequently, it can be seen that it is possible to improve average precision (AP) with slight loss of FPS by adding post processing according to an embodiment of the present disclosure without changing network configuration. In all cases, AP was increased, and ResNet-101 and SSD (0.97%) exhibited the highest improvement.

In FIG. 13, (a) shows the result of object detection using only the existing object detection network, and (b) shows the result when a network of an object detection apparatus 100 based on a rectifying key according to an embodiment of the present disclosure is applied as a post-processing method. It can be seen that, in (a) of FIG. 13, a vehicle detected from a first image was not detected from a second image. Also in (b) of FIG. 13, the object detection apparatus 100 according to the embodiment of the present disclosure detected a corresponding portion and added a bounding box to the second image.

In the second experiment, both the rectifying key and the tracking key were used. The KITTI tracking dataset was used as test dataset, and the bounding box that should not be detected in the existing ground truth was deleted. In order to train ResNet50 with YOLOv2 and to train ResNet101 with YOLOv2, a image corresponding to the left column of FIG. 15 of the KITTI 2D object sensing dataset was used. In addition, 80% of 7,481 sheets were used as a learning dataset, whereas 20% was used as a verification dataset. Network training options are identical to those in the first experiment excluding a maximum number of epochs of 400.

Also, in an experiment according to an embodiment, for verification in various networks, ResNet50 including YOLOv3 and DarkNet53 including YOLOv4 were installed and used as add-ons provided by MathWorks. Also, in an embodiment, YOLOv4 was used for verification in the newest network. The networks were trained with COCO and were adjusted to three classes (car was labeled as car, bus, truck, or train was labeled as truck, and person was labeled as human).

TABLE 4

| Dataset | Network | Algorithm | mAP | Car | Classes Human | Track | Improvement | FPS |
|---|---|---|---|---|---|---|---|---|
| KITTI Multi-object tracking 0009 [16] | ResNet50 & YOLOv2 [17] | Ref | 71.97 | 81.69 | 41.93 | 92.28 | — | 31.48 |
| | | Rectifying | 72.14 | 81.89 | 41.93 | 92.61 | 0.24% | 26.59 |
| | | Tracking | 72.16 | 81.77 | 41.93 | 92.77 | 0.26% | 28.51 |
| | | Rectifying & Tracking | 72.21 | 81.93 | 41.93 | 92.77 | 0.34% | 26.90 |
| | ResNet101 & YOLOv2 [17] | Ref | 69.43 | 81.40 | 34.00 | 92.90 | — | 23.45 |
| | | Rectifying | 69.70 | 81.81 | 33.95 | 93.36 | 0.39% | 21.92 |
| | | Tracking | 69.68 | 81.31 | 33.89 | 93.84 | 0.36% | 21.48 |
| | | Rectifying & Tracking | 69.96 | 82.14 | 33.89 | 93.84 | 0.76% | 20.04 |
| | DarkNet53 & YOLOv3 [18] | Ref | 47.70 | 55.98 | 1.149 | 85.96 | — | 1.414 |
| | | Rectifying | 48.29 | 56.40 | 1.149 | 87.31 | 1.24% | 1.390 |
| | | Tracking | 48.35 | 56.29 | 1.149 | 87.63 | 1.38% | 1.372 |
| | | Rectifying & Tracking | 48.49 | 56.33 | 1.149 | 87.99 | 1.67% | 1.365 |
| | CSPDarkNet53 & YOLOv4 [19] | Ref | 53.83 | 68.66 | 1.720 | 91.10 | — | 3.311 |
| | | Rectifying | 53.96 | 68.96 | 1.720 | 91.20 | 0.25% | 3.293 |
| | | Tracking | 54.11 | 69.23 | 1.720 | 91.37 | 0.52% | 3.266 |
| | | Rectifying & Tracking | 54.16 | 69.44 | 1.720 | 91.33 | 0.63% | 3.242 |
| KITTI Multi-object tracking 0015 [16] | ResNet50 & YOLOv2 [17] | Ref | 66.06 | 92.17 | 58.46 | 47.55 | — | 31.50 |
| | | Rectifying | 66.33 | 92.50 | 58.93 | 47.55 | 0.40% | 27.22 |
| | | Tracking | 67.79 | 92.92 | 59.04 | 51.42 | 2.62% | 27.13 |
| | | Rectifying & Tracking | 68.06 | 93.34 | 59.41 | 51.42 | 3.02% | 27.10 |
| | ResNet101 & YOLOv2 [17] | Ref | 69.07 | 93.20 | 59.80 | 54.20 | — | 22.10 |

TABLE 4-continued

| Dataset | Network | Algorithm | mAP | Car | Classes Human | Track | Improvement | FPS |
|---|---|---|---|---|---|---|---|---|
| | | Rectifying | 69.38 | 93.75 | 60.23 | 54.17 | 0.46% | 20.32 |
| | | Tracking | 70.65 | 93.72 | 60.47 | 57.76 | 2.29% | 21.68 |
| | | Rectifying & Tracking | 70.93 | 94.01 | 61.02 | 57.76 | 2.69% | 20.33 |
| | DarkNet53 & YOLOv3 [18] | Ref | 38.25 | 83.88 | 30.88 | 0 | — | 1.611 |
| | | Rectifying | 38.53 | 84.27 | 31.32 | 0 | 0.71% | 1.532 |
| | | Tracking | 38.40 | 84.06 | 31.13 | 0 | 0.38% | 1.305 |
| | | Rectifying & Tracking | 38.65 | 84.55 | 31.40 | 0 | 1.03% | 1.414 |
| | CSPDarkNet53 & YOLOv4 [19] | Ref | 39.70 | 90.88 | 28.21 | 0 | — | 3.362 |
| | | Rectifying | 40.14 | 91.38 | 29.04 | 0 | 1.12% | 3.248 |
| | | Tracking | 40.18 | 91.56 | 28.96 | 0 | 1.21% | 3.196 |
| | | Rectifying & Tracking | 40.57 | 91.95 | 29.75 | 0 | 2.19% | 3.239 |

Table 4 shows the results of applying the network of the object detection apparatus 100 according to the embodiment. It can be seen that the mean AP (mAP) was increased and lowering in FPS was very slight. In most case, it can be seen that the mAP was increased with an FPS loss of about 10%. In particular, it can be seen that, when the network according to the embodiment was applied to YOLOv4 in the 0015 dataset, it was possible to increase the mAP by 2.19% with an FPS loss of about 3.7%.

In the 0015 dataset, in the case of YOLOv3 and YOLOv4, truck class was not sensed. Since the network according to the embodiment is dependent on the sensing result of the existing network, the truck may not be sensed even by the network according to the embodiment.

It can be seen that, when the rectifying and tracking keys were individually used, the mAP was increased. It can be seen that, when both keys were simultaneously used, the increase was even greater. When dataset 0015, ResNet50, and YOLOv2 were simultaneously used, the mAP was significantly improved up to 3.02%, compared to the reference. Additionally, the reason that the AP of all classes did not rise is that the target was optimized with the highest mAP.

That is, since the movement of a moving object and the movement of a static object are different from each other, further improvement is possible in the case of aiming to improve the AP of a specific class.

Figure 15:
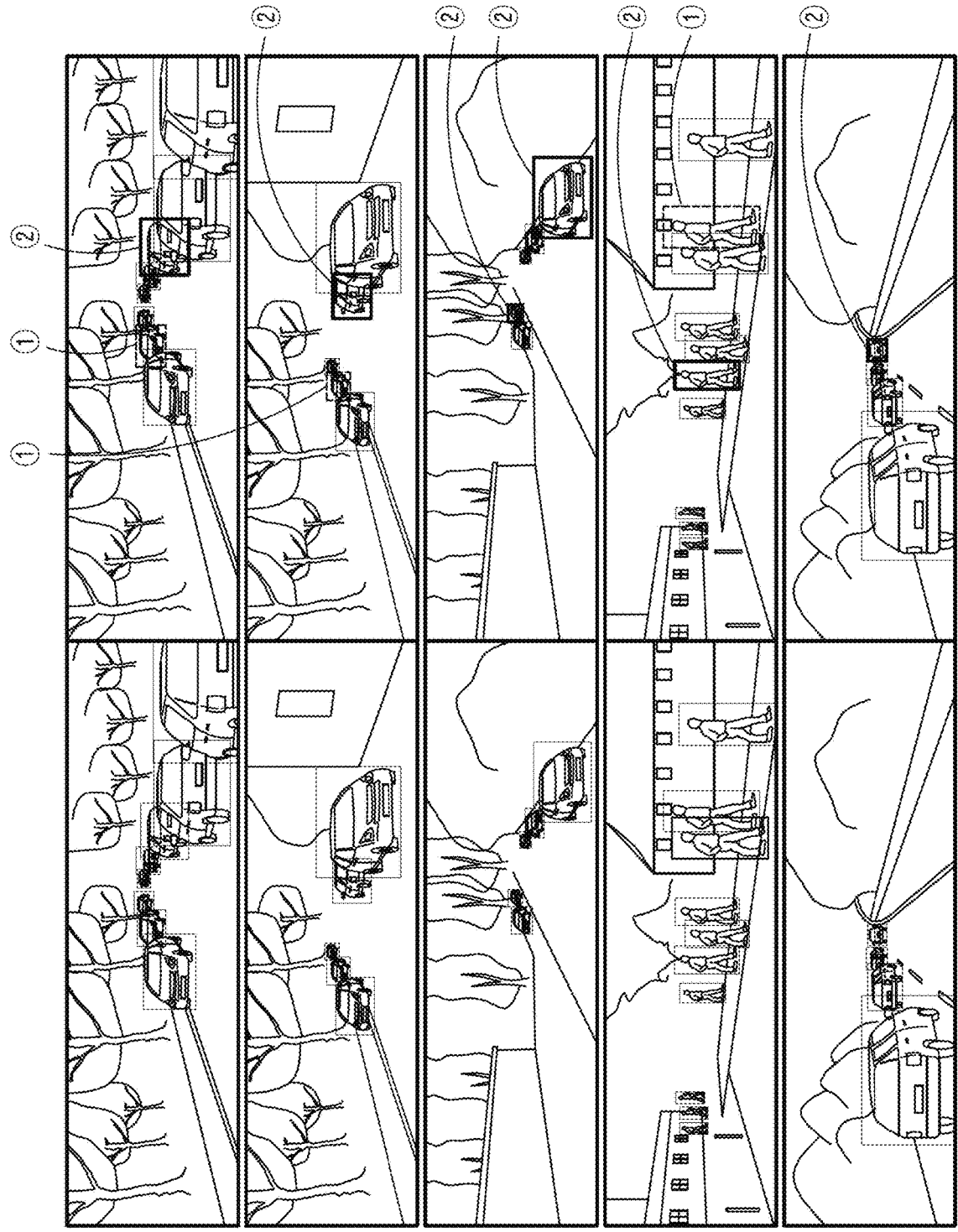
FIG. 15 is an illustrative view showing rectifying-key and tracking-key-based object detection correcting results according to an embodiment of the present disclosure.

FIG. 15 is a visualization of results of applying the network of the object detection apparatus 100 to various datasets. Bounding box ① is a box added by the rectifying key, and bounding box ② is a box added by the tracking key. When compared with the left image to which post processing of the object detection apparatus 100 according to the embodiment of the present disclosure was not applied, it can be seen that precision in object detection is improved.

Table 5 shows the results of optimization of the GIoU critical value and CIoU critical value described above with reference to FIG. 16. Both the rectifying key and the tracking key were used. Most of the checked elements were less than 300, which is the result of searching only 3% of the work that checked all 100×100 matrices using kernel search described above. When the optimization technique was used, it can be seen that, in all cases, higher mAP was recorded than when using fixed values (GIoU=0.5 and CIoU=0.5)

Figure 17:
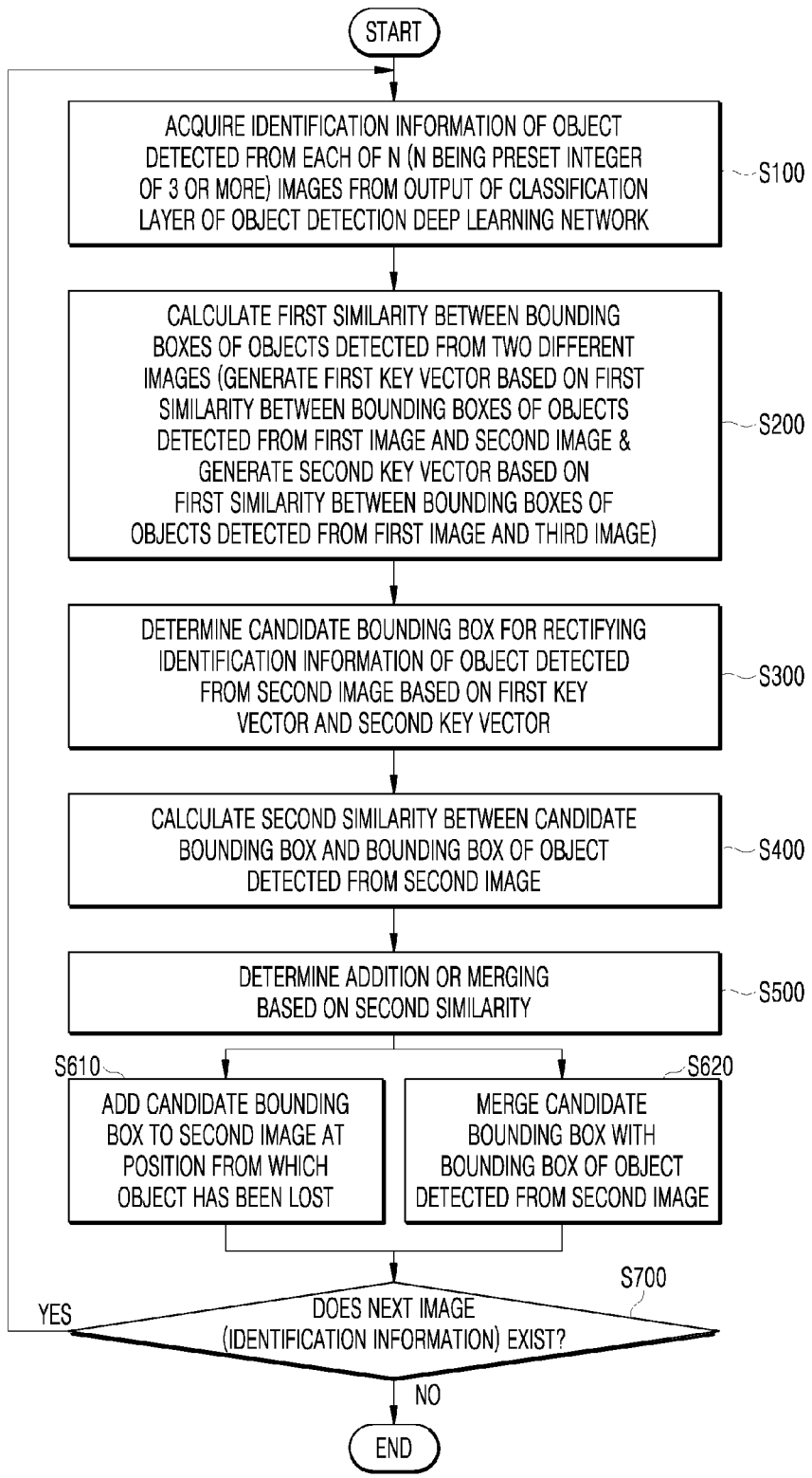
FIG. 17 is a flowchart illustrating a rectifying-key-based object detection method according to an embodiment of the present disclosure.

FIG. 17 is a flowchart illustrating a rectifying-key-based object detection method according to an embodiment of the present disclosure.

Referring to FIG. 17, in step S100, the object detection apparatus 100 acquires identification information of an object detected from each of N (N being a preset integer of 3 or more) images from the output of a classification layer of a pre-trained deep learning detection network.

The object detection apparatus 100 according to the embodiment rectifies object loss in a situation in which continuous images are input. For example, when an object detected from a first image and a third image is not detected from a second image, the object detection apparatus 100 may rectify the object that has not been detected from the second image, whereby it is possible to improve precision in object detection for the continuous images.

At this time, the first image may be a reference image for object detection loss compensation, and the third image may be a comparative image that becomes a comparison target for determining whether to perform rectification. The second image, which is an image acquired between the first image and the third image, may be a rectified image that becomes a target to be rectified. That is, among the first image, the second image, and the third image, the first image may be an

TABLE 5

| | | Mean average precision | | |
|---|---|---|---|---|
| Dataset | Network | Using GIoU = 0.5, CIoU = 0.5 | Using optimized GIoU, CIoU | Number of searched points |
| KITTI | ResNet50 & YOLOv2 [17] | 70.44 | 72.21 | 260 |
| Multi-object | ResNet101 & YOLOv2 [17] | 69.53 | 69.96 | 88 |
| tracking | DarkNet50 & YOLOv3 [18] | 48.18 | 48.49 | 122 |
| 0009 [16] | CSPDarkNet53 & YOLOv4 [19] | 53.98 | 54.16 | 120 |
| KITTI | ResNet50 & YOLOv2 [17] | 66.38 | 68.06 | 228 |
| Multi-object | ResNet101 & YOLOv2 [17] | 70.82 | 70.93 | 88 |
| tracking | DarkNet50 & YOLOv3 [18] | 38.40 | 38.65 | 83 |
| 0015 [16] | CSPDarkNet53 & YOLOv4 [19] | 40.28 | 40.57 | 154 | image captured first in order of time, and the third image may be an image captured finally in order of time.

Also, in this embodiment, identification information may include, for example, whether the object detected from the image exists, an identification label, an object ID, identification probability, the coordinates of the bounding box, and the size of the bounding box.

In step S200, the object detection apparatus 100 calculates first similarity between bounding boxes of objects detected from two different images.

At this time, the object detection apparatus 100 may generate a first key vector based on first similarity between bounding boxes of objects detected from the first image and the second image, and may generate a second key vector based on first similarity between bounding boxes of objects detected from the first image and the third image.

That is, the object detection apparatus 100 may generate a key vector based on the result of comparison between the objects detected from the first image and the third image and a key vector based on the result of comparison between the objects detected from the first image and the second image. As previously described, the key vector is information of determination as to whether corresponding objects detected from two different images are the same based on similarity between the bounding boxes. The key vector may determine whether corresponding objects detected from the first image and the third image are the same, and may determine whether corresponding objects detected from the first image and the second image are the same, whereby it is possible to determine the object lost from the second image.

In an embodiment, Euclidian distance, FSIMc, IoU, GIoU, or CIoU may be used as a method of calculating first similarity.

In step S300, the object detection apparatus 100 determines a candidate bounding box for rectifying identification information of the object detected from the second image based on the first key vector and the second key vector.

In step S400, the object detection apparatus 100 calculates second similarity between the candidate bounding box and bounding boxes of the object detected from the second image.

In this embodiment, second similarity may be calculated by Euclidian distance, FSIMc, IoU, GIoU, or CIoU.

In step S500, the object detection apparatus 100 determines whether to add the candidate bounding box to the second image or to merge the candidate bounding box with the second image based on second similarity.

In step S610, the object detection apparatus 100 adds the candidate bounding box to the second image at the position thereof from which the object has been lost, or in step S620, the object detection apparatus 100 merges the candidate bounding box with the bounding box of the object detected from the second image.

In this embodiment, the bounding boxes are compared based on second similarity, as a filter capable of classifying candidate bounding boxes selected based on the key vector into addition and merging cases. Therefore the object detection 100 data of all bounding boxes of the second image and data of a candidate bounding box to be added are compared with each other in order to determine whether the candidate bounding box is to be added to or to be merged with a corresponding bounding box of the second image.

That is, the object detection apparatus 100 may calculate second similarity between the candidate bounding box to be added and all bounding boxes of the second image, and may check whether a value equal to or greater than a preset critical value exists. When the value exists, the object detection apparatus may merge the candidate bounding box with a matched one of the bounding boxes of the second image without addition of the bounding box.

In step S700, the object detection apparatus 100 checks whether the next image (identification information) exists. When the next image does not exist, the object detection apparatus 100 may finish the cycle. When the next image exists, the object detection apparatus 100 may return to step S100, and may acquire identification information of a new image (frame) in order to perform the next cycle.

Figure 18:
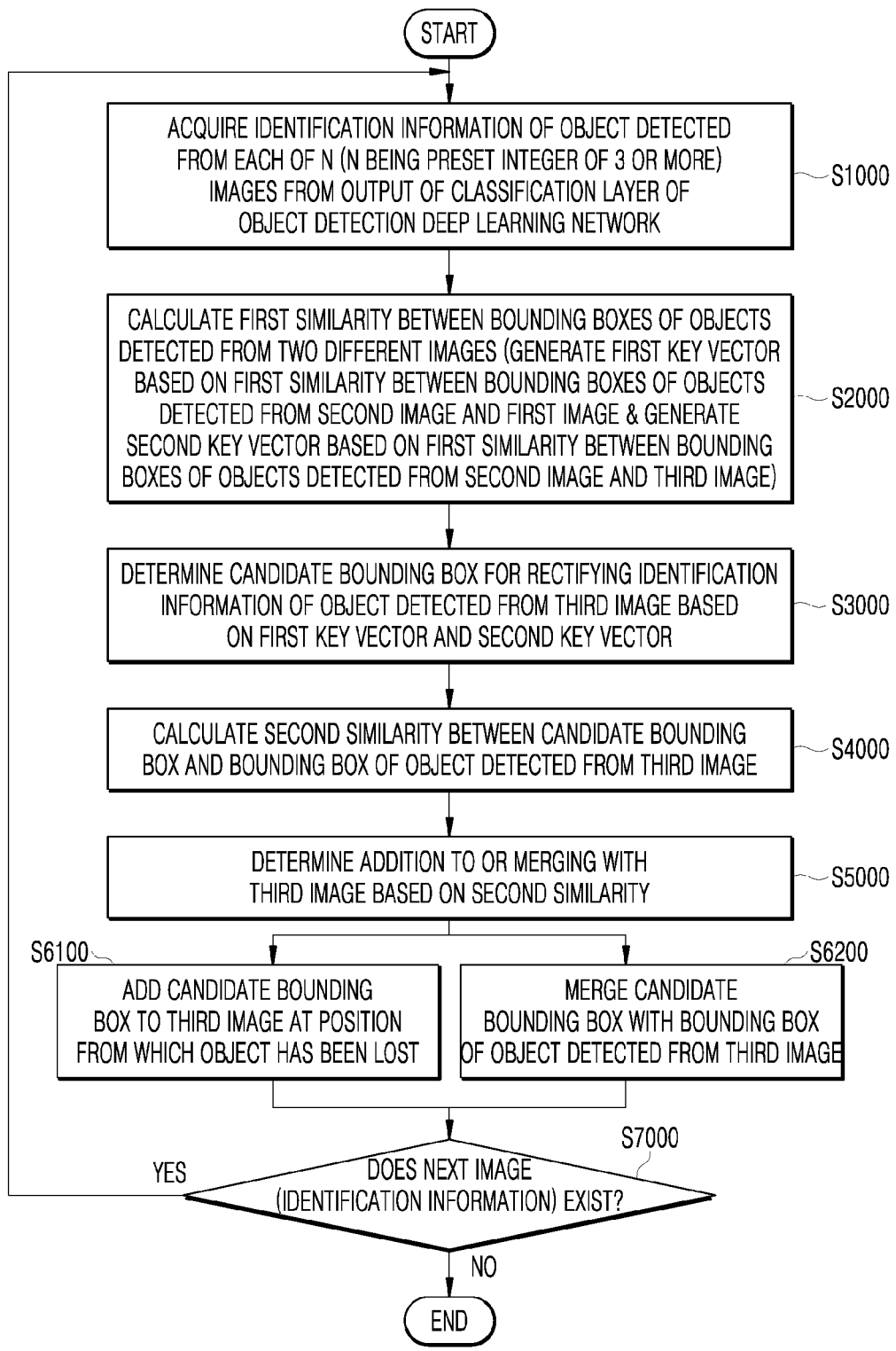
FIG. 18 is a flowchart illustrating a tracking-key-based object detection method according to an embodiment of the present disclosure.

FIG. 18 is a flowchart illustrating a tracking-key-based object detection method according to an embodiment of the present disclosure.

Referring to FIG. 18, in step S1000, the object detection apparatus 100 acquires identification information of an object detected from each of N (N being a preset integer of 3 or more) images from the output of a classification layer of a pre-trained deep learning detection network.

In an embodiment, the object detection apparatus 100 may acquire identification information of an object detected from each of N (N being a preset integer of 3 or more) images continuous in order of capture from the output of a determination layer of an object detection deep learning network.

Through the following steps, the object detection apparatus 100 may generate a tracking key based on identification information of an object detected from each of two or more images having early capturing time order, among the N images, and may track identification information of an object detected from an image having later capturing time order than the two or more images, among the N images.

In step S2000, the object detection apparatus 100 may calculate first similarity between bounding boxes of objects detected from two different images.

At this time, the object detection apparatus 100 may generate a first key vector, which is a tracking key, based on first similarity between bounding boxes of objects detected from the second image and the first image, and may generate a second key vector, which is a tracking key, based on first similarity between bounding boxes of objects detected from the second image and the third image.

As previously described, the key vector is information of determination as to whether corresponding objects detected from two different images are the same based on similarity between the bounding boxes.

In an embodiment, Euclidian distance, FSIMc, IoU, GIoU, or CIoU may be used as a method of calculating first similarity.

In step S3000, the object detection apparatus 100 determines a candidate bounding box for tracking identification information of the object detected from the third image based on the first key vector and the second key vector.

In step S4000, the object detection apparatus 100 calculates second similarity between the candidate bounding box and bounding boxes of the object detected from the third image.

In this embodiment, second similarity may be calculated by Euclidian distance, FSIMc, IoU, GIoU, or CIoU.

In step S5000, the object detection apparatus 100 may determine whether to add the candidate bounding box to the third image or to merge the candidate bounding box with the third image based on second similarity.

In step S6100, the object detection apparatus 100 may add the candidate bounding box to the third image at the position thereof from which the object has been lost, or in step S6200, the object detection apparatus 100 may merge the candidate bounding box with the bounding box of the object detected from the third image.

In an embodiment, the bounding boxes are compared based on second similarity, as a filter capable of classifying candidate bounding boxes selected based on the key vector into addition and merging cases. Therefore the object detection apparatus 100 data of all bounding boxes of the third image and data of a candidate bounding box to be added are compared with each other in order to determine whether the candidate bounding box is to be added or to be merged with a corresponding bounding box of the third image.

That is, the object detection apparatus 100 may calculate second similarity between the candidate bounding box to be added and all bounding boxes of the third image, and may check whether a value equal to or greater than a preset critical value exists. When the value exists, the object detection apparatus may merge the candidate bounding box with a matched one of the bounding boxes of the third image without addition of the bounding box.

In step S7000, the object detection apparatus 100 checks whether the next image (identification information) exists. When the next image does not exist, the object detection apparatus may finish the cycle. When the next image exists, the object detection apparatus may return to step S1000, and may acquire identification information of a new image (frame) in order to perform the next cycle.

In an embodiment, the bounding box added based on the tracking key in the previous cycle may be excluded when tracking identification information of an object detected based on the tracking key in the next cycle.

As is apparent from the above description, according to embodiments of the present disclosure, post processing is performed with respect to the result of determination by an object detection network that detects an object from an image in real time, whereby an object that is not detected by the object detection network may be rectified or whether there is an identical object (matching) may be determined, and therefore it is possible to improve precision in object detection based on continuous images.

Also, in an embodiment, the object detection network is modularized as a network that is optimized for continuous images, whereby, when an output value (classification probability) is post-processed based on the result of object detection classification by a pre-trained deep learning network as a module without retraining of the network, it is possible to improve precision in object detection by a conventionally trained deep learning network without additional cost.

Also, in an embodiment, when the modularized object detection network is coupled to the existing trained deep learning network, it is possible to improve performance of the object detection network irrespective of performance of the existing network. In addition, since the object detection network is applicable to various networks, it is possible to improve versatility of the object detection network.

In addition, object identity determination with a small amount of calculation is utilized, whereby it is possible to improve precision in object detection while not greatly lowering frames per second (FPS).

The effects of the present disclosure are not limited to those mentioned above, and other effects not mentioned may be clearly understood by those skilled in the art from the following description.

Embodiments of the present disclosure described above may be implemented in the form of computer programs that may be executed through various components on a computer, and such computer programs may be recorded in a computer-readable medium. In this case, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program instructions, such as ROM, RAM, and flash memory devices.

The computer programs may be those specially designed and constructed for the purposes of the present disclosure or they may be of the kind well known and available to those skilled in the art of computer software. Examples of program code include both machine code, such as that produced by a compiler, and higher level code that may be executed by the computer using an interpreter.

As used in the present disclosure (particularly in the appended claims), the term "the" and similar demonstrative terms include both singular and plural references. Also, it should be understood that any numerical range recited herein is intended to include all sub-ranges subsumed therein (unless expressly indicated otherwise) and accordingly, the disclosed numerical ranges include every individual value between the minimum and maximum values of the numerical ranges.

The order of individual steps in process claims according to the present disclosure does not imply that the steps must be performed in this order; rather, the steps may be performed in any suitable order, unless expressly indicated otherwise. The present disclosure is not necessarily limited to the order of operations given in the description. All examples described herein or terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereto.

The present disclosure is thus not limited to the example embodiments described above, and rather is intended to include the following appended claims, and all modifications, equivalents, and alternatives falling within the spirit and scope of the following claims.

What is claimed is:

1. An method for object detection with respect to continuous images, at least a portion of each step of which is performed by a processor, the method comprising:
  acquiring, at the processor, identification information of an object detected from each of N (N being a preset integer of 3 or more) images from an output of a classification layer of an object detection deep learning network; and
  correcting, by the processor, the identification information of at least one of the object detected from at least one image among the N images based on the identification information of the object detected from each of at least two images among the N images, wherein correcting the identification information of the at least one object detected from the at least one image among the N images includes adding a newly detected object and associated identification to a result of the at least one image among the N images responsive to a determination that the newly detected object being absent from the result of the at least one image.

2. The method according to claim 1, further comprises correcting, by the processor, at least one of whether the object detected from any one of the N images exists, an identification label, an object ID, an identification probability, coordinates of a bounding box of the object detected, or a size of the bounding box.

3. The method according to claim 1, further comprises correcting, by the processor a size of a bounding box of the detected object.

4. The method according to claim 1, further comprising:
generating, by the processor, a key vector based on a result of comparison between the objects detected from two different images, among the N images; and
correcting, by the processor, the identification information based on the key vector.

5. The method according to claim 4, further comprising:
calculating, by the processor, first similarity between bounding boxes of the objects detected from the two different images; and
generating, by the processor, the key vector based on the first similarity between the bounding boxes.

6. The method according to claim 5, wherein the key vector is based on an information of determination as to whether corresponding objects detected from the two different images are identical to each other based on the first similarity between the bounding boxes.

7. The method according to claim 5, further comprising:
determining, by the processor, a candidate bounding box for correcting the identification information of the object detected from at least one of the N images based on the key vector; and
determining, by the processor, whether to add or merge the candidate bounding box based on a second similarity between the candidate bounding box and a bounding box of the object detected from at least one of the N images.

8. The method according to claim 7, wherein the first similarity and the second similarity are based on morphological information of the objects detected from at least one of the N images.

9. The method according to claim 8, wherein the first similarity and the second similarity are based further on color information of the objects detected from at least one of the N images.

10. The method according to claim 7, wherein, among a first image, a second image, and a third image of the N images, the first image is an image captured first in order of time, and the third image is an image captured finally in order of time.

11. The method according to claim 10, further comprises rectifying, by the processor, the identification information of the object detected from the second image based on similarity between the objects detected from the first image and the second image and similarity between objects detected from the first image and the third image.

12. The method according to claim 11, further comprising:
generating, by the processor, a first key vector based on the first similarity between bounding boxes of the objects detected from the first image and the second image and generating a second key vector based on the first similarity between bounding boxes of the objects detected from the first image and the third image;
determining, by the processor, a candidate bounding box for rectifying the identification information of the object detected from the second image based on the first key vector and the second key vector; and
adding, by the processor, the candidate bounding box to the second image or merging the candidate bounding box with the bounding box of the object detected from the second image based on the second similarity between the candidate bounding box and the bounding box of the object detected from the second image.

13. The method according to claim 10, further comprises correcting, by the processor, the identification information of the object detected from the third image based on similarity between the objects detected from the second image and the first image and similarity between objects detected from the second image and the third image.

14. The method according to claim 13, further comprises:
generating, by the processor, a first key vector based on the first similarity between bounding boxes of the objects detected from the second image and the first image and generating a second key vector based on the first similarity between bounding boxes of the objects detected from the second image and the third image;
determining, by the processor, a candidate bounding box for tracking the identification information of the object detected from the third image based on the first key vector and the second key vector; and
adding, by the processor, the candidate bounding box to the third image or merging the candidate bounding box with the bounding box of the object detected from the third image based on the second similarity between the candidate bounding box and the bounding box of the object detected from the third image.

15. The method according to claim 14, wherein
the N images further comprise a fourth image captured after capturing of the third image, and
the method further comprises correcting the identification information of an object detected from the fourth image based on similarity between the objects detected from the third image and the second image and similarity between the objects detected from the third image and the fourth image, and excluding a detected object added to the identification information of the third image based on the first image and the second image from an object comparison target detected when correcting the identification information of the object detected from the fourth image.

16. The method according to claim 13, further comprises tracking, by the processor, the identification information of the object detected from the third image based on similarity between detected objects that exist in a region corresponding to a preset region factor, among the first image, the second image, and the third image.

17. The method according to claim 16, wherein the preset region factor is set based on any one of an image capturing environment, classes of detected objects, or a movement speed of a camera that has captured the N images.

18. The method according to claim 1, further comprising changing, by the processor, a shape of a bounding box of at least one of objects detected from a target image, which is one of remaining images, based on a result of comparison between objects detected from two different images, among the N images, or adding a new bounding box to the target image.

19. An apparatus for object detection with respect to continuous images, the apparatus comprising:
a memory; and
at least one processor connected to the memory, the processor being configured to execute computer-readable commands included in the memory, wherein the at least one processor is set:
to perform an operation of acquiring identification information of an object detected from each of N (N being a preset integer of 3 or more) images from an output of a classification layer of an object detection deep learning network; and
to perform an operation to correct the identification information of the object detected from any one of the N images based on the identification information of the object detected from each of at least two images, among the N images, wherein the identification information to be corrected by addition of a newly detected object and associated identification to a result of at least one image among the N images responsive to a determination that the newly detected object being absent from the result of the at least one image.

20. The apparatus according to claim 19, wherein the at least one processor is set to perform an operation of changing a shape of a bounding box of the object detected from a target image, which is one of remaining images, based on a result of comparison between objects detected from two different images, among the N images, or adding a new bounding box to the target image.

* * * * *